US006430355B1

(12) United States Patent
Nagasawa

(10) Patent No.: US 6,430,355 B1
(45) Date of Patent: Aug. 6, 2002

(54) EDITING DEVICE WITH DISPLAY OF PROGRAM ID CODE AND IMAGES OF THE PROGRAM

(75) Inventor: Fumihiro Nagasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/125,091

(22) PCT Filed: Dec. 9, 1997

(86) PCT No.: PCT/JP97/04522

§ 371 (c)(1),
(2), (4) Date: Dec. 4, 1998

(87) PCT Pub. No.: WO98/26418

PCT Pub. Date: Jun. 18, 1998

(30) Foreign Application Priority Data

Dec. 9, 1996 (JP) .............................................. 8-328901

(51) Int. Cl.[7] ................................................. H04N 5/76
(52) U.S. Cl. .............................. 386/52; 360/13; 369/83; 345/725
(58) Field of Search ......................... 386/4, 52, 53–64; 360/13; 369/83; 345/723, 724, 725, 726; H04N 5/76, 5/92, 9/79

(56) References Cited

U.S. PATENT DOCUMENTS

| 4,974,111 A | * | 11/1990 | Platte et al. .................. 386/56 |
| 5,388,197 A | * | 2/1995 | Rayner ........................ 345/723 |
| 5,467,288 A | * | 11/1995 | Fasciano et al. ............. 345/723 |
| 5,675,752 A | * | 10/1997 | Scott et al. .................. 345/723 |
| 5,682,326 A | * | 10/1997 | Klingler et al. .............. 345/723 |
| 5,732,184 A | * | 3/1998 | Chao et al. .................... 386/55 |
| 5,734,923 A | * | 3/1998 | Sugawa et al. .............. 345/723 |
| 5,760,767 A | * | 6/1998 | Shore et al. ................. 345/723 |
| 5,781,188 A | * | 7/1998 | Amiot et al. ................ 345/723 |
| 5,930,446 A | * | 7/1999 | Kanda .......................... 386/52 |

FOREIGN PATENT DOCUMENTS

| JP | 63-123285 | 5/1988 |
| JP | 2-214082 | 8/1990 |
| JP | 4-117686 | 4/1992 |
| JP | 5-198141 | 8/1993 |
| JP | 6-153130 | 5/1994 |
| JP | 6-295565 | 10/1994 |

* cited by examiner

*Primary Examiner*—Thai Tran
(74) *Attorney, Agent, or Firm*—Frommer Lawrence & Haug LLP.; William S. Frommer

(57) ABSTRACT

Program configuration is carried out by using the screen of a display section 17 and an input operating section 18 of a video editing device 10, and data of this program configuration is recorded in a RAM 19. In accordance with the data of the program configuration, an editing control section 11 reads out a video material corresponding to material identification information of this program configuration from a digital VTR for reproduction 1 and records the video material onto a HDD 12. In accordance with the data of the program configuration, the editing control section 11 reproduces the video material of the corresponding material identification information from the HDD 12 and supplies the video material to a digital VTR for recording 5. Thus, the video editing device which automatically edits a program by inputting the video material having the material identification information after setting the program configuration is provided.

8 Claims, 23 Drawing Sheets

| PROGRAM ID | PROGRAM NAME | PRODUCTION STAFF | REGISTRATION DATE | SCHEDULED COMPLETION DATE | NOTE |
|---|---|---|---|---|---|
| 0001 | IN-HOUSE NEWS NO.70 | YATO | '93. 8. 25 | '93. 9. 14 | |
| 0002 | IN-HOUSE NEWS NO.71 | SUZUKI | '93. 9. 01 | '93. 9. 21 | |
| 0003 | IN-HOUSE NEWS NO.72 | YATO | '93. 9. 08 | '93. 9. 28 | |
| 0004 | | | | | |
| | | | | | |
| | | | | | |
| | | | | | |

[NEW] [DELETE] [OPEN] [SAVE] [ALTER] [CONFIGURE] [Q-SHEET] [END]

PROGRAM SELECTION SCREEN

FIG.5

| PROGRAM ID | PROGRAM NAME | PRODUCTION STAFF | REGISTRATION DATE | SCHEDULED COMPLETION DATE | NOTE |
|---|---|---|---|---|---|
| 0001 | IN-HOUSE NEWS NO.70 | YATO | '93. 8. 25 | '93. 9. 14 | |
| 0002 | IN-HOUSE NEWS NO.71 | SUZUKI | '93. 9. 01 | '93. 9. 21 | |
| 0003 | IN-HOUSE NEWS NO.72 | YATO | '93. 9. 08 | '93. 9. 28 | |
| 0004 | SPECIAL PROGRAM | TANAKA | '93. 9. 10 | '93. 9. 27 | |
| | | | | | |
| | | | | | |
| | | | | | |
| | | | | | |

[ NEW ] [ DELETE ] [ OPEN ] [ SAVE ] [ ALTER ] [ CONFIGURE ] [ Q-SHEET ] [ END ]

PROGRAM SELECTION SCREEN

FIG.6

PROGRAM CONFIGURATION SCREEN

| MATERIAL ID | MATERIAL NAME | MATERIAL TIME | STAFF | RECORDING DATE | MONITOR |
|---|---|---|---|---|---|
| V005-03 | OPENING TITLE | 00M23S10F | HAMAHATA | '93. 2. 20 | IN-HOUSE NEWS |
| T001-00 | NO.72 | — | | | NO.72 |
| V000-00 | HEADLINE | 00M10S00F | YATO | '93. 2. 20 | HEADLINE |
| V001-00 | STUDIO RECORDING 1 | 00M13S00F | YATO | '93. 2. 21 | |
| V002-00 | COVERAGE CUT 1 | 00M06S20F | YATO | '93. 2. 22 | |
| V003-00 | STUDIO RECORDING 2 | 01M10S00F | YATO | '93. 2. 21 | |
| V004-00 | COVERAGE CUT 2 | | YATO | | |
| V006-00 | COVERAGE CUT 3 | 01M10S00F | YATO | '93. 2. 22 | |

PROGRAM ID: 0003
PROGRAM NAME: IN-HOUSE NEWS NO.72

Buttons: NEW, DELETE, ALTER, SAVE, REC, MONI, STOP, Q-SHEET, END

PROGRAM CONFIGURATION SCREEN

FIG.10

FIG.13 EDITING SCREEN

EDITING SCREEN

FIG.15 EDITING SCREEN

JOG/SHUTTLE DIAL

AUDIO EFFECT WINDOW

FIG.21 MATERIAL SCREEN

FIG.23 MATERIAL SCREEN

| MATERIAL ID | MATERIAL NAME | MATERIAL TIME | STAFF | RECORDING DATE | MONITOR |
|---|---|---|---|---|---|
| V020-00 | NAME UNSET 5 | 00M33S10F | YATO | '93. 9. 22 | |
| V021-00 | NAME UNSET 6 | 00M25S00F | YATO | '93. 9. 22 | |
| V023-00 | NAME UNSET 7 | 15M20S00F | YATO | '93. 9. 22 | |
| V023-01 | NAME UNSET 7-1 | 00M15S10F | YATO | '93. 9. 22 | |
| V023-02 | NAME UNSET 7-2 | 00M20S00F | YATO | '93. 9. 22 | |
| V023-03 | NAME UNSET 7-3 | 00M05S15F | YATO | '93. 9. 22 | |
| V023-04 | NAME UNSET 7-4 | 00M10S00F | YATO | '93. 9. 22 | |
| V024-00 | NAME UNSET 8 | 00M15S10F | YATO | '93. 9. 22 | |

Buttons: VIDEO/AUDIO, STILL PICTURE, AUDIO

Buttons: NEW, DELETE, ALTER, SAVE, REC, MONI, STOP, END

EDITING DEVICE WITH DISPLAY OF PROGRAM ID CODE AND IMAGES OF THE PROGRAM

TECHNICAL FIELD

This invention relates to an editing device, an editing system and an editing method for editing video and/or audio materials.

BACKGROUND ART

An editing device is provided which takes a video material and/or an audio material from plural sources such as a material tape, a video camera and a microphone, and edits these materials into a series of materials.

The editing device employs, for example, a method of installing plural VTRs for reproduction in parallel, reproducing materials, selecting necessary portions from these materials, and then sequentially connecting and recording the selected portions. Conventionally, the editing device employing such method has been broadly used.

On the other hand, another editing device referred to as a non-linear editing device system is provided. This non-linear editing system enables recording and reproduction of materials on and from a randomly accessible recording medium like a hard disc as a temporary recording medium in editing, and thus enables non-sequential editing. Therefore, quick reading of a desired video material and insertion and deletion of a material with respect to a series of video materials may be carried out without having any inconvenience, thus improving operability of the editing work.

Meanwhile, recently, various video and/or audio-related devices such as a VTR and a video camera have been significantly diffused, and the demand for an editing device for editing materials has been increased accordingly.

In a number of cases, such editing device is used with various limitations put thereon, like the skill of an operator who operates the device.

To actually carry out editing using video materials, the non-linear editing system requires the operator to have predetermined technical knowledge concerning video editing. Therefore, the non-linear editing device has a problem that it is difficult to sufficiently exert functions thereof if the operator lacks the predetermined technical knowledge.

In view of the foregoing problem, it is an object of the present invention to provide an editing device, an editing system and an editing method which enable sufficient exertion of functions of the editing device and the editing system as described above even when various limitations such as the skill of the operator are imposed in actual editing work using video and/or audio materials.

DISCLOSURE OF THE INVENTION

According to the present invention, there is provided an editing device including: a non-linearly accessible recording medium; recording means for recording video and/or audio signals onto the recording medium; display means for displaying a program configuration table indicating, every predetermined unit, images and/or sounds necessary for each program on the basis of configuration of the program; operating means for operating the program configuration table displayed by the display means; and control means for performing control to register an identification code appended every predetermined unit of the program configuration table onto the program configuration table by using the operating means, and to cause the recording means to record only a predetermined unit of images and/or sounds selected by operation of the operating means from predetermined units of images and/or sounds indicated by the registered identification codes.

According to the present invention, there is also provided an editing method including: a first step of displaying, every predetermined unit, images and/or sounds necessary for each program on the basis of configuration of the program, and displaying a program configuration table with an identification code appended thereto every predetermined unit; a second step of selecting the images and/or sounds necessary for each program, every predetermined unit; and a third step of recording, onto a recording medium, only video and/or audio signals corresponding to the predetermined unit of images and/or sounds selected at the second step, and displaying the images and/or sounds recorded every predetermined unit which is necessary for each program of the program configuration table.

According to the present invention, there is also provided an editing system including an editing device and an imaging device. The editing device includes: a non-linearly accessible recording medium; editing and recording means for recording video and/or audio signals onto the recording medium; display means for displaying a program configuration table indicating, every predetermined unit, images and/or sounds necessary for each program on the basis of configuration of the program; operating means for operating the program configuration table displayed by the display means; and control means for registering an identification code appended every predetermined unit of the program configuration table onto the program configuration table by using the operating means, and causing the display means to display the identification code. The imaging device includes: identification code input means for inputting the identification code appended every predetermined unit of the program configuration table displayed by the display means; imaging and recording means for imaging the predetermined unit of images and/or sounds corresponding to the inputted identification code, and recording the imaged video and/or audio signals together with the identification code onto the recording medium; and output means for outputting the identification code and the video and/or audio signals recorded on the recording medium. The control means performs control to cause the output means of the imaging device to output only the predetermined unit of video and/or audio signals selected by operation of the operating means from the predetermined units of images and/or sounds indicated by the registered identification codes, and to cause the editing and recording means to record the outputted video and/or audio signals onto the recording medium.

According to the present invention, there is further provided an editing method including: a first step of displaying, every predetermined unit, images and/or sounds necessary for each program on the basis of configuration of the program, and displaying a program configuration table with an identification code appended thereto every predetermined unit; a second step of imaging and recording, onto a first recording medium, the images and/or sounds necessary for each program on the basis of the identification code displayed at the first step; a third step of selecting the images and/or sounds necessary for each program, every predetermined unit; and a fourth step of recording, onto a second recording medium, only video and/or audio signals corresponding to the predetermined unit of images and/or sounds selected at the third step from the images and/or sounds recorded at the second step, and displaying the images and/or sounds recorded every predetermined unit onto the second recording medium which is necessary for each program of the program configuration table.

BRIEF DESCRIPTION OF THE DRAWINGS

FIG. 5 is a view showing the program selection screen in which a program is newly registered.

FIG. 6 is a view showing a program selection screen in which a program is being selected to open a program configuration table.

FIG. 10 is a view showing the state that a material is being monitored.

FIG. 23 is a view showing the material screen in which cut-out of the material cut has been completed.

BEST MODE FOR CARRYING OUT THE INVENTION

A preferred embodiment of an editing device, an editing system and an editing method according to the present invention will now be described in detail with reference to the drawings.

Figure 1:
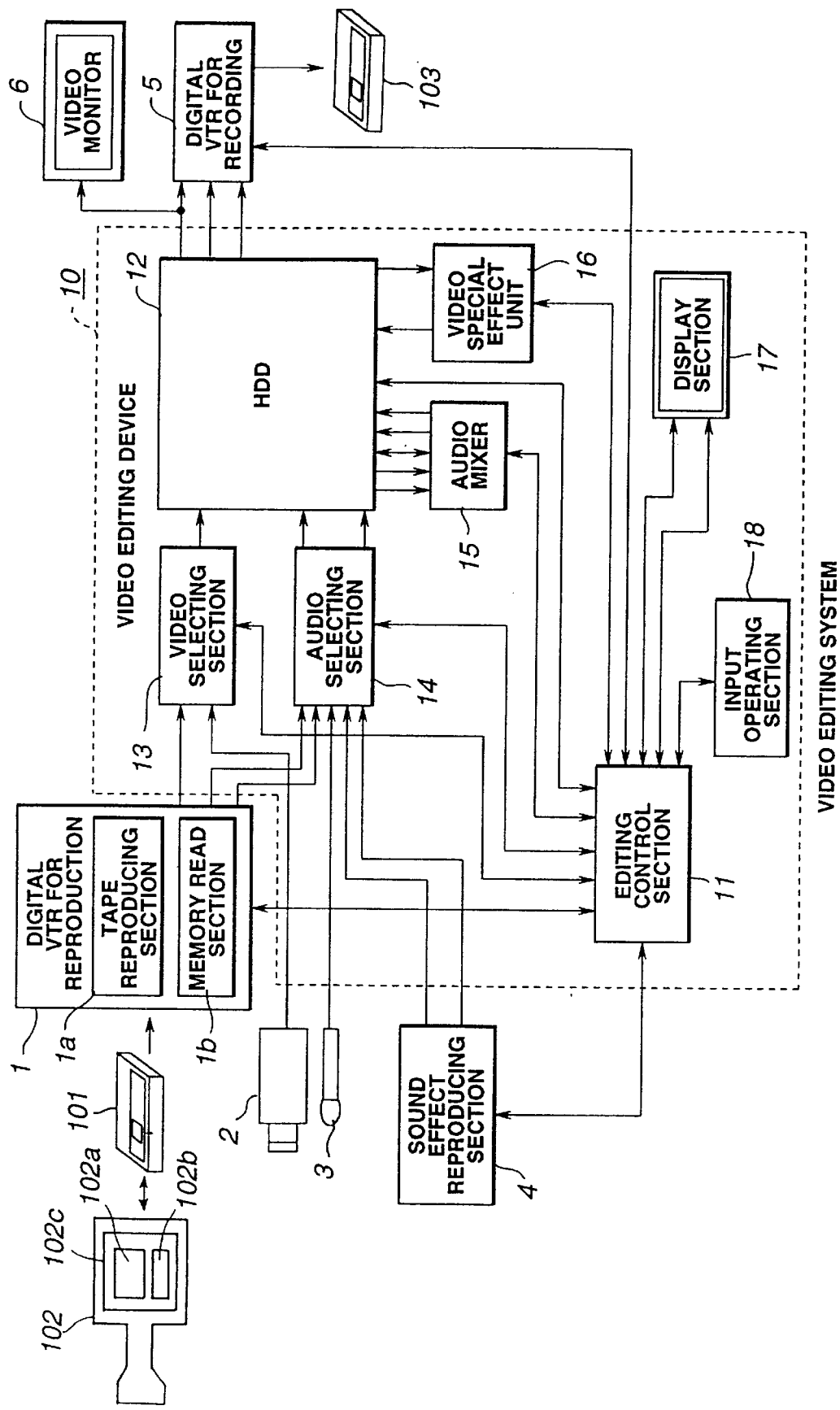
FIG. 1 is a block diagram schematically showing the structure of an entire editing system according to an embodiment of the present invention.

FIG. 1 shows an editing system including an editing device as an embodiment of the present invention and a peripheral equipment connected to this editing device. Specifically, the editing system shown in FIG. 1 includes a digital VTR for reproduction 1, a video camera 2, a microphone 3, a sound effect reproducing section 4, an editing device 10, a digital VTR for recording 5, and a video monitor 6.

The digital VTR for reproduction 1 includes a tape reproducing section 1b and a memory read section 1b. Information of a video material obtained by coverage and information of a material ID are recorded on a tape section and a memory section of a material cassette tape 101, respectively. In the digital VTR for reproduction 1, the tape reproducing section 1a reads the video material recorded on the tape section of the cassette tape 101, and the memory read section 1b reads the material ID corresponding to the video material, recorded on the memory section of the cassette tape 101. The video material and audio material recorded on the cassette tape 101 are shot and recorded by an imaging device 102. This imaging device 102 is provided with an index picture recording circuit 102a within a video and audio recording/reproducing circuit 102c for automatically recording frames (referred to as index pictures) such as frames before and after the video material and frames before and after a scene change onto the cassette tape 101. The index picture is thinned to 1/16 by the index picture recording circuit 102a, and is stored in a memory 102b provided within the index picture recording circuit 102a. When the cassette tape 101 is taken out of the imaging device 102 on completion of shooting, plural thinned frames, that is, plural index pictures, are recorded onto the cassette tape 101. When the cassette tape 101 completed in shooting is inserted in the digital VTR for reproduction, the plural index pictures are automatically reproduced from the cassette tape 101.

The video camera 2 obtains the video material and outputs the video material to the video material editing device 10. The microphone 3 obtains the audio material and outputs the audio material to the video editing device 10. The sound effect reproducing section 4 reproduces a sound effect under the control of the video editing device 10 and outputs the sound effect to the video editing device 10.

The digital VTR for recording 5 records the video material and/or audio material completed in editing by the video editing device 10 onto an edited tape 103. The video monitor 6 monitors the video material which has been edited by the video editing device 10 and is recorded onto the edited tape 103 by the digital VTR for recording 5. In the case where an operator wishes to confirm the audio material together with the video material completed in editing, an output from a speaker, not shown, connected to the video monitor 6 may be used.

The video editing device 10 includes an editing control section 11, an HDD (hard disc drive) 12, a video selecting section 13, an audio selecting section 14, an audio mixer 15, a video special effect unit 16, a display section 17, and an input operating section 18.

The editing control section 11 controls the video editing device 10 and peripheral equipments connected to the video editing device 10. Specifically, in the video editing device 10, the editing control section 11 performs control to cause the HDD 12, the video selecting section 13, the audio selecting section 14, the audio mixer 15, the video special effect unit 16, the display section 17 and the input operating section 18 to operate in cooperation with one another. The editing control section 11 also performs control to cause the digital VTR for reproduction 1, the sound effect reproducing section 4 and the digital VTR for recording 5 as peripheral equipments to operate in cooperation with one another. The editing control section 11 performs control based on the a given program and the data including the material ID read out from the memory section of the material cassette tape 101 by the memory read section 1b of the digital VTR for reproduction 1.

The HDD 12 stores the video material and the audio material and suitably reads or writes the video material and the like, under the control of the editing control section 11, so that editing is carried out in the video editing device 10 and that the video materials and the like are processed by the audio mixer 15 and the video special effect unit 16. The video material and the like thus edited and processed are supplied to the peripheral equipments through an interface.

That is, the HDD 12 is supplied with the video material from the video selecting section 13 and the audio material from the audio selecting section 14 under the control of the editing control section 11. Also, the audio material is inputted/outputted between the HDD 12 and the audio mixer 15, and the video material is inputted/outputted between the HDD 12 and the video special effect unit 16. Also, the HDD 12 supplies the video material and the audio material as outputs from the video editing device 10 to the digital VTR for recording 5 and the video monitor 6.

The video selecting section 13 selects the video material outputted from the digital VTR for reproduction 1 and the video camera 2 and outputs the selected video material to the HDD 12, under the control of the editing control section 11.

The audio selecting section 14 selects the audio material outputted from the digital VTR for reproduction 1, the microphone 3 and the sound effect reproducing section 4 and outputs the selected audio material to the HDD 12, under the control of the editing control section 11.

The audio mixer 15 is supplied with the audio material from the HDD 12, processes the audio material and outputs the processed audio material to the HDD 12, under the control of the editing control section 11.

The video special effect unit 16 is supplied with the video material from the HDD 12, carries out special effect processing on the video material and outputs the processed video material to the HDD 12, under the control of the editing control section 11.

The display section 17 receives various information for the video material and the audio material concerning editing from the editing control section 11, and displays the received information. The display section 17 enables the operator to grasp the current status of editing.

The input operating section 18 includes a mouse, a keyboard and a jog/shuttle dial. The input operating section 18 is a user interface together with the display section 17 for the operator, in order to carry out various operations such as input/output of the video and audio materials to/from the video editing device 10, recording on/reproduction from the HDD 12, operation for special effect processing of the special effect unit 16, and operation for audio processing of the audio mixer 15.

As described above, the video editing system of the present embodiment includes the digital VTR for reproduction 1, the video camera 2, the microphone 3, the sound effect reproducing section 4 and the digital VTR for recording 5 as external equipments, and includes the video editing device 10. That is, the video editing system is constituted by external equipments including the digital VTR for reproduction 1 for reproducing a tape on which video materials and the like are recorded, the video camera 2, the microphone 3 and the sound effect reproducing section 4. The video editing system is also constituted by the video editing device 10 including the video selecting section 13 for selecting the video material from the digital VTR for reproduction 1 and the video camera 2, the audio selecting section 14 for selecting the audio material from the digital VTR for reproduction 1 and the video camera 2, the HDD 12 as a non-linearly accessible recording medium for storing the video material selected by the video selecting section 13 and the audio material selected by the audio selecting section 14, the input operating section 18 including the keyboard and the mouse, the editing control section 11 for controlling the video editing device 10 in accordance with the operation information from the input operating section 18, the display section 17 for displaying editing material information, the special effect unit 16 for carrying out special effect processing on the video material, and the audio mixer 15 for processing the audio material. The video editing system is further constituted by the digital VTR for recording 5 as another external equipment.

For editing the video material and the audio material by using the above-described editing device, the following two methods are considered.

A first method is to determine in advance materials necessary for a program by the video editing device 10 and then actually shoot video materials and audio materials based on the determined information. After the end of shooting, the materials are recorded on the video editing device 10 while it is confirmed whether the materials determined in advance before shooting have been actually shot. The materials are edited so as to produce a material for broadcasting by the VTR for recording 5.

A second method is to store all the first shot materials into the video editing device 10, then select and edit materials necessary for a program, and output the edited materials to the VTR for recording 5.

The first method is to shoot predetermined materials and then carry out editing by the editing device 10, while the second method is to randomly collect materials and select necessary materials therefrom. In the present embodiment, the second method is employed as an editing method of video materials and audio materials by the editing device 10. Also, in the present invention, recording of materials to the editing device 10 from the VTR for reproduction 1 and editing of materials are carried out on a GUI (graphic user interface) displayed on the display section 17 of the video editing device 10. Therefore, each screen displayed on the display section 17 of the editing device 10 will be first described, and the operating method of each screen will be described subsequently.

Figure 2:
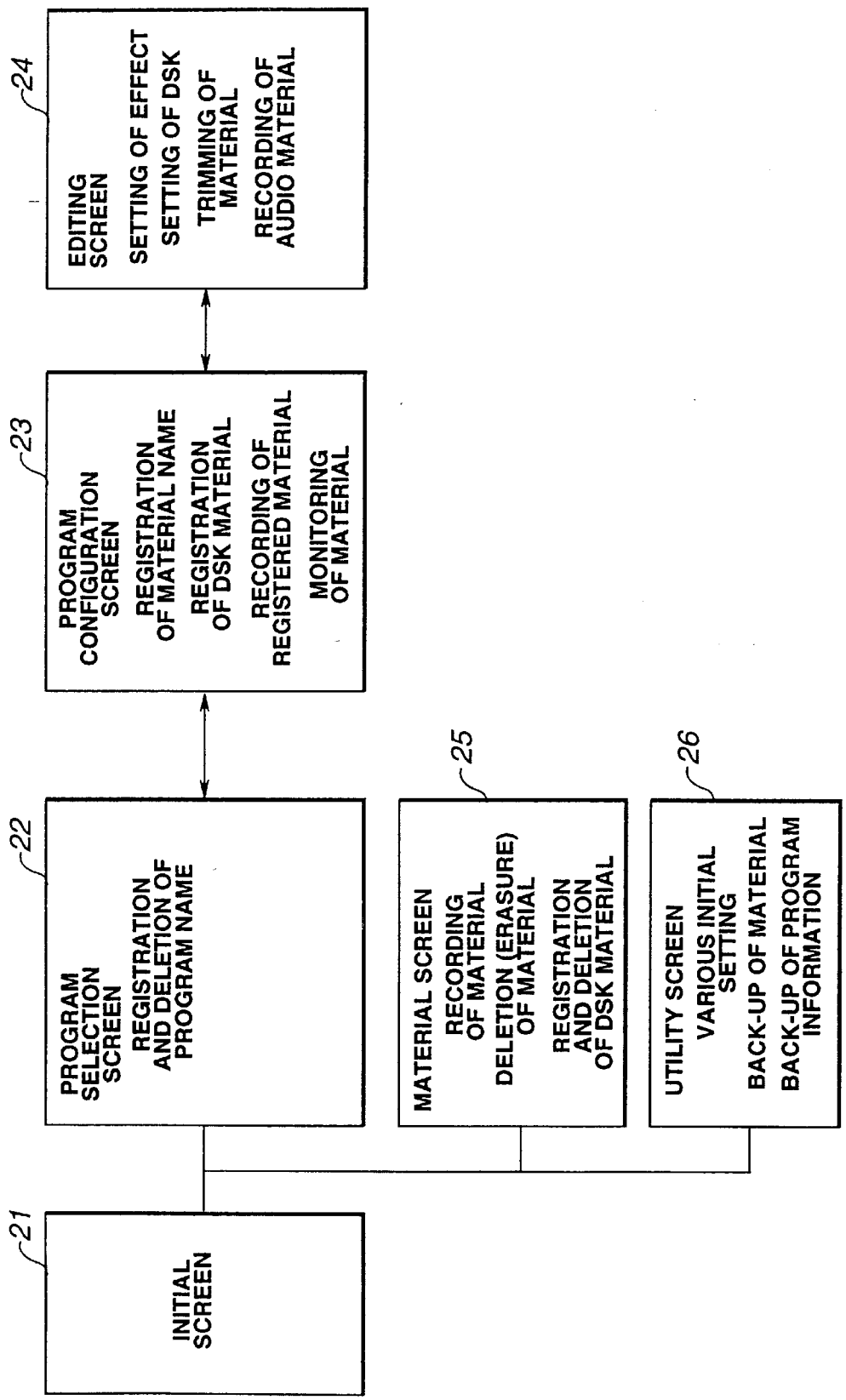
FIG. 2 is a view showing editing procedures through corresponding screens.

FIG. 2 shows each screen displayed on the display section 17 of the video editing device 10 and the relation between the respective screens. As shown in FIG. 2, there are six types of screens, that is, an initial screen 21, a program selection screen 22, a program configuration screen 23, an editing screen 24, a material screen 25 and a utility screen 26. The initial screen 21 enables transition to three types of screens, that is, the program selection screen 22, the material screen 25 and the utility screen 26. Also, transition from these three types of screens to the initial screen 21 is possible. In addition, transition between the program selection screen 22, the program configuration screen 23 and the editing screen 24 is possible. The above-described six types of screens are stored in an advance in a ROM, not shown, of the editing control section 11 and are displayed on the display section 17. Operation of each screen and transition between the respective screens may be carried out by operating the input operating section 18. Such operation will be described later in detail.

Each of the initial screen 21, the program selection screen 22, the program configuration screen 23, the editing screen 24, the material screen 25 and the utility screen 26 will now be described.

The initial screen 21 is displayed on the display section 17 when the power of the video editing device 10 is turned on or when the video editing device 10 is reset. As a matter of course, the initial screen may be displayed through transition from the other screens. The operator may shift from this initial screen 21 to the other screens by actually operating the input operating section 18.

Figure 3:
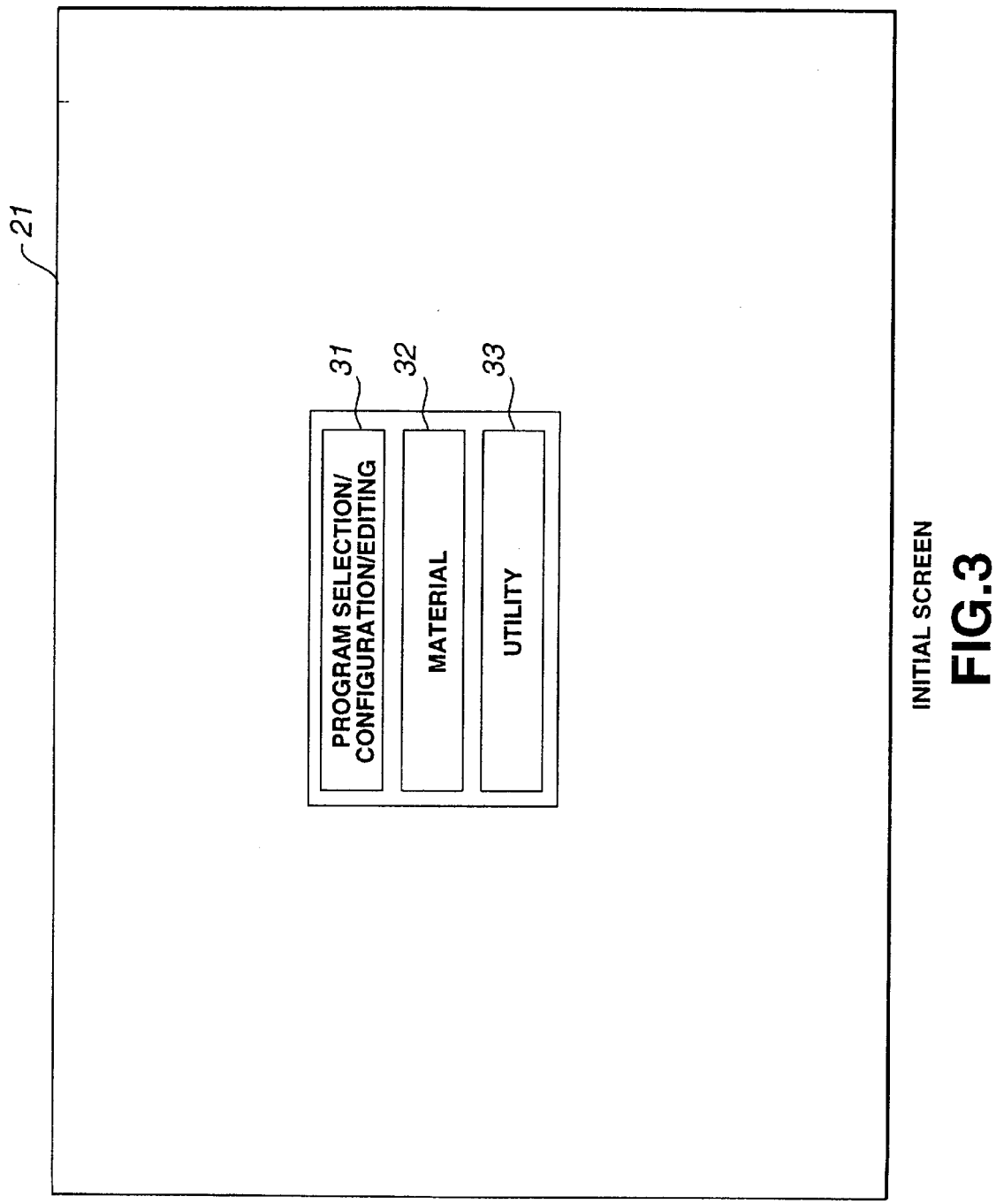
FIG. 3 is a view showing an initial screen.

On the initial screen 21, as shown in FIG. 3, three title bars are displayed, that is, a title bar 31 displaying "PROGRAM SELECTION/CONFIGURATION/EDITING", a title bar 32 displaying "MATERIAL", and a title bar 33 displaying "UTILITY".

By operating the input operating section 18, for example, clicking the mouse constituting the input operating section 18 to select one of the three title bars, the operator may shift to the corresponding screen. Specifically, if the title bar 31 displaying "PROGRAM SELECTION/ CONFIGURATION/EDITING" is selected, the screen shifts to the program selection screen 22. If the title bar 32 displaying "MATERIAL" is selected, the screen shifts to the material screen 25. If the title bar 33 displaying "UTILITY" is selected, the screen shifts to the utility screen 26.

The program selection screen 22 will now be described. The program selection screen 22 may be opened from the initial screen 21 or the program configuration screen 23 and the editing screen 24. The program selection screen 22 is adapted for registering a program name or deleting a registered program name.

Figure 4:
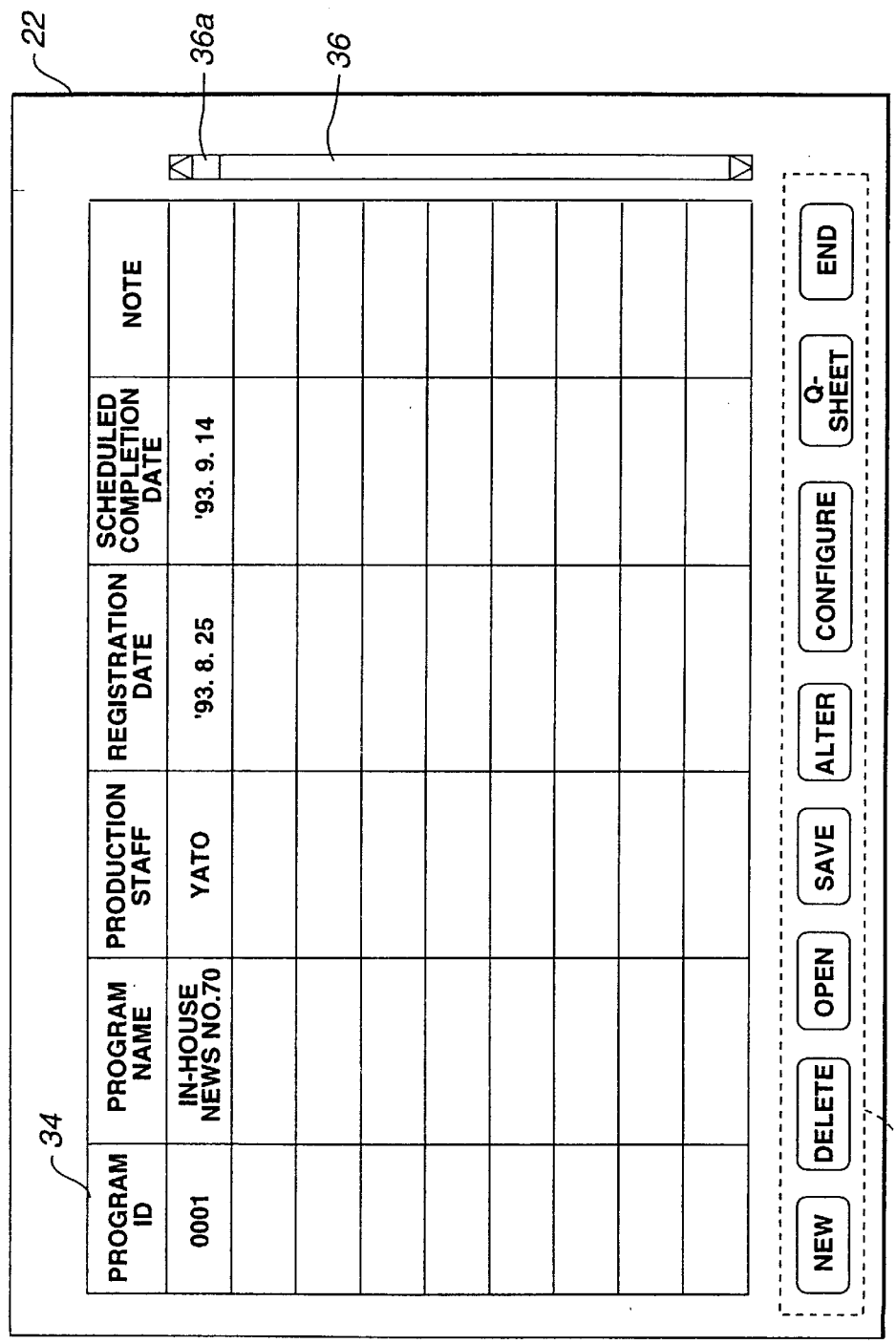
FIG. 4 is a view showing a program selection screen opened from the initial screen.

As shown in FIG. 4, a program name display screen 34, an operation menu 35 and a scroll bar 36 are displayed on the program selection screen 22.

The program name display screen 34 includes items of "PROGRAM ID", "PROGRAM NAME", "PRODUCTION STAFF", "REGISTRATION DATE", "SCHEDULED COMPLETION DATE", and "NOTE" sequentially from left to right in the uppermost row, and the respective columns indicate the corresponding items, as shown in FIG. 4.

The operation menu 35 displayed on the lowermost part of the program selection screen 22 includes eight buttons of "NEW", "DELETE", "OPEN", "SAVE", "ALTER", "CONFIGURE", "Q-SHEET", and "END".

The scroll bar 36 is displayed on the right side of the program name display screen 34. By operating the input operating section 18, for example, operating the mouse, a scroll button 36a of the scroll bar 36 can be caused to scroll up and down the program name display screen 34.

The state of the program selection screen 22 of FIG. 4 is an example at the time when this program selection screen 22 is opened from the initial screen 21. In this case, a state that a program ID "0001" and a program name "IN-HOUSE NEWS NO. 70" have already been registered on the program name display screen 34 is shown. That is, the program ID "0001", the program name "IN-HOUSE NEWS NO. 70", production staff "YATO", registration date "'93.8.25", scheduled completion date "'93.9.14" are already registered in the first row of the program name display screen 34, thus showing various information concerning the program with the program name of "IN-HOUSE NEWS NO. 70" such as the program ID, the program production staff member, the registration date on which the program was registered on this screen, and the scheduled completion date of the program.

The configuration of the program is made by this program selection screen 22 before coverage, and materials obtained through the coverage are recorded, every program, onto the HDD 12 of the video editing device 10, thus carrying out editing of the video materials. That is, after input of necessary items onto the program name display screen 34 in the program selection screen 22 is completed, coverage report is carried out for obtaining materials and the materials obtained through the coverage are recorded onto the HDD 12 of the video editing device 10 for every program name inputted on the program name display screen.

FIG. 5 shows the state of the screen at the time when a program is newly registered on the program selection screen 22.

To newly register a program, a "NEW" button 38 of the operation menu 35 is clicked by operating the input operating section 18, for example, the mouse. Then, the position of a row where a program is to be newly registered is selected by clicking a desired row of the program name display screen 34 by using the mouse. In the example shown in FIG. 5, as the fourth row is selected, the row turns into a selected row 39 which is highlighted in display so that a new program may be registered in this row. In the present embodiment, highlighting display means display which is discriminable from other buttons, including display of a different color.

In the "PROGRAM ID" column of the fourth row in the program name display screen 34, "0004" is already displayed. That is, in the present embodiment, when a program is newly registered by the "NEW" button so that the selected row 39 is highlighted in display, the program ID is automatically issued.

FIG. 6 shows the state of the program selection screen 22 immediately before a program inputted in advance on the program name display screen 34 is selected to open the program configuration screen 23 showing the program configuration.

On the program name display screen 34, as the third row displaying the program ID "0003" and the program name "IN-HOUSE NEWS NO. 72" is clicked and selected by using the mouse, this row 41 is highlighted in display so as to indicate that this row is selected. Then, as the "OPEN" button 40 of the operation menu 35 is clicked by operating the input operating section 18, for example, the mouse, the screen shifts to the program configuration screen corresponding to this program.

The program configuration screen 23 will now be described.

The program configuration screen 23 is a screen for registering video materials of each program with respect to each program registered on the program selection screen 22. The program configuration screen 23 may be opened from the program selection screen 22. The program configuration screen 23 may also be opened from the above-described initial screen 21, if necessary. In addition, the program configuration screen 23 may also be opened from the editing screen 24 as later described.

Figure 7:
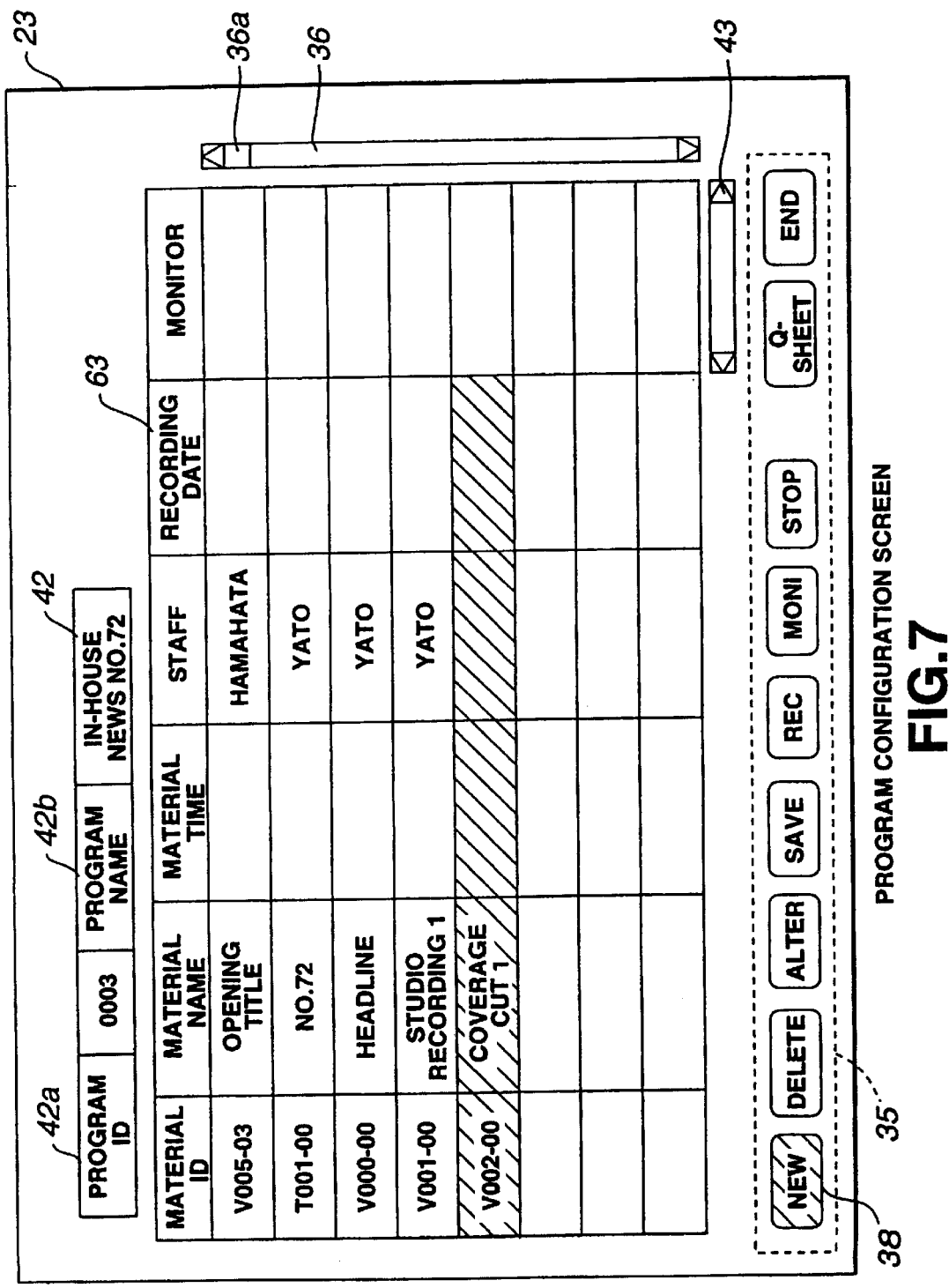
FIG. 7 is a view showing the program configuration screen in which a material name is being inputted.

The program configuration screen 23 is constituted by a program name display section 42, a material name display screen 63, an operation menu 35, a scroll bar 36, and a monitor scroll bar 43, as shown in FIG. 7. The program configuration screen 23 is adapted mainly for recording the material name of each program, registering digital still keying (DSK) materials, recording the registered materials onto the HDD 12 of the video editing device 10, and monitoring the materials.

Each item on the program configuration screen 23 will now be described with reference to FIG. 7.

The program display section 42 includes a program ID 42a and a program name 42b. The program ID and the program name of each program registered on the program selection screen 22 are displayed in the program ID 42a and the program name 42b of the program display section 42, respectively. In the example of FIG. 7, the program configuration screen 23 corresponding the program ID "0003" and the program name "IN-HOUSE NEWS NO. 72" registered and selected in FIG. 6 is displayed. The program configuration screen 23 is displayed on the display section 17 of the video editing device 10, so that the operation of input to each item is carried out by operating the input operating section 18 of the video editing device 10.

The material name display screen 63 includes columns of "MATERIAL ID", "MATERIAL NAME", "MATERIAL TIME", "STAFF", "RECORDING DATE", and "MONITOR" sequentially from left to right.

"MATERIAL ID" represents the ID appended to each video (audio) material obtained through coverage or the like. "MATERIAL NAME" represents the name appended to each video (audio) material obtained through coverage or the like. "MATERIAL TIME" indicates the time for recording each material classified by "MATERIAL NAME" and "MATERIAL ID" onto the HDD 12 of the video editing device 10. When the material is being recorded, count-up is carried out in accordance with the recording time of the material which is being recorded. "STAFF" represents the staff member in charge of obtaining and recording each video material. The staff member who is in charge of each material classified by the material ID and the material name may be known from this "STAFF" column. "RECORDING DATE" indicates the date of recording each material classified by the material ID and the material name onto the HDD 12 of the video editing device 10. The "MONITOR" column is an item provided for overlook display of the video recorded on the HDD 12. The overlook display of the video in the "MONITOR" column will be described later. In the example of FIG. 7, the material ID and the material name are being inputted in the fifth row of the material name display screen 63 and recording of each material is not carried out. Therefore, all the columns of "MATERIAL TIME", "RECORDING DATE" and "MONITOR" in the material name display screen 63 are blank. Input to the "MATERIAL NAME" column and input to the "MATERIAL ID" column are associated with each other. For example, "MATERIAL ID" may be displayed and registered at the same time as "MATERIAL NAME" is inputted.

The operation menu 35 displayed on the lowermost part of the program configuration screen 23 includes nine buttons of "NEW", "DELETE", "ALTER", "SAVE", "REC", "MONI", "STOP", "Q-SHEET", and "END".

The "NEW" button of the operation menu 35 is for newly registering a material. When a material is to be newly registered, the position of a row where new registration is to be carried out in the material name display screen 63 is selected by operating the input operating section 18. As the "NEW" button 38 of the operation menu 35 is selected by operating the input operating section 18, for example, clicking the mouse, the row where a material is to be registered is highlighted in display, thus enabling input of a new material. In the example of FIG. 7, the fifth row of the material name display screen 63 is selected and the "NEW" button 38 is operated by the input operating section 18.

The "DELETE" button of the operation menu 35 is for deleting an item of each material inputted or registered in the material name display screen 63. The position of a row to be deleted in the material name display screen 63 is selected by operating the input operating section 18, and this entire row is deleted by selecting the "DELETE" button of the operation menu 35 by the operating input operating section 18, for example, clicking the mouse. Also, by selecting each item of each material, for example, only the material name by the input operating section 18 and selecting the "DELETE" button of the operation menu 35 by operating the input operating section 18, for example, clicking the mouse, only the material name may be deleted.

The "ALTER" button of the operation menu 35 is for altering the items of each material inputted or registered in the material name display screen 63. For example, as an altered row in the material name display screen 63 is selected by operating the input operating section 18 and then the "ALTER" button is selected by operating the input operating section 18, a display prompting input to the "MATERIAL ID" column of the material name display screen 63 is provided, for example, a prompt is displayed in the "MATERIAL ID" column.

The "SAVE" button of the operation menu 35 is for saving each item or the entire material display screen. For example, as a saved row of the material name display screen 63 is selected by operating the input operating section 18 and then the "SAVE" button is selected by operating the input operating section 18, the entire selected row of the material name display screen 63 is saved.

The "REC", "MONI", and "STOP" buttons of the operation menu 35 are adapted for carrying out recording, monitoring, and stop recording of each material selected in the material name display screen 63, respectively. These buttons will be later described in detail.

In FIG. 7, the program ID 42a of "0003" and the program name of "IN-HOUSE NEWS NO. 72" are displayed in the program display section 42, and the program configuration screen 23 displays the configuration of this program.

In first row of the material name display screen 63 of FIG. 7, a material ID "V005-03", a material name "OPENING TITLE", and a staff member "HAMAHATA" are displayed. In the second row, a material ID "T001-00", a material name "NO. 72", and a staff member "YATO" are displayed. In the third row, a material ID "V000-00", a material name "HEADLINE", and a staff member "YATO" are displayed. In the fourth row, a material ID "V001-00", a material name "STUDIO RECORDING 1", and a staff member "YATO" are displayed. In the fifth row, a material ID "V002-00" and a material name "COVERAGE CUT 1" are newly inputted, as described above.

The material having the material ID "T001-00" of the second row is a material for carrying out DSK as the background of the material having the material ID "V005-03" of the first row, and is discriminated by the initial letters "T" and "S" of the material ID. The above-described series of operation is carried out at a time point before the coverage for actually shooting the material, and the cameraman shoots the material based on the material ID registered on the program configuration screen 23. Specifically, immediately before shooting the material of the registered material ID, the cameraman inputs the material ID to a shooting equipment such as a VTR-loaded camera, by operating an operating button or GUI of this camera so as to record the material ID on the memory cassette of the material tape cassette 101. By this shooting method, the material and the material ID are recorded on the material tape cassette in the corresponding manner.

Figure 8:
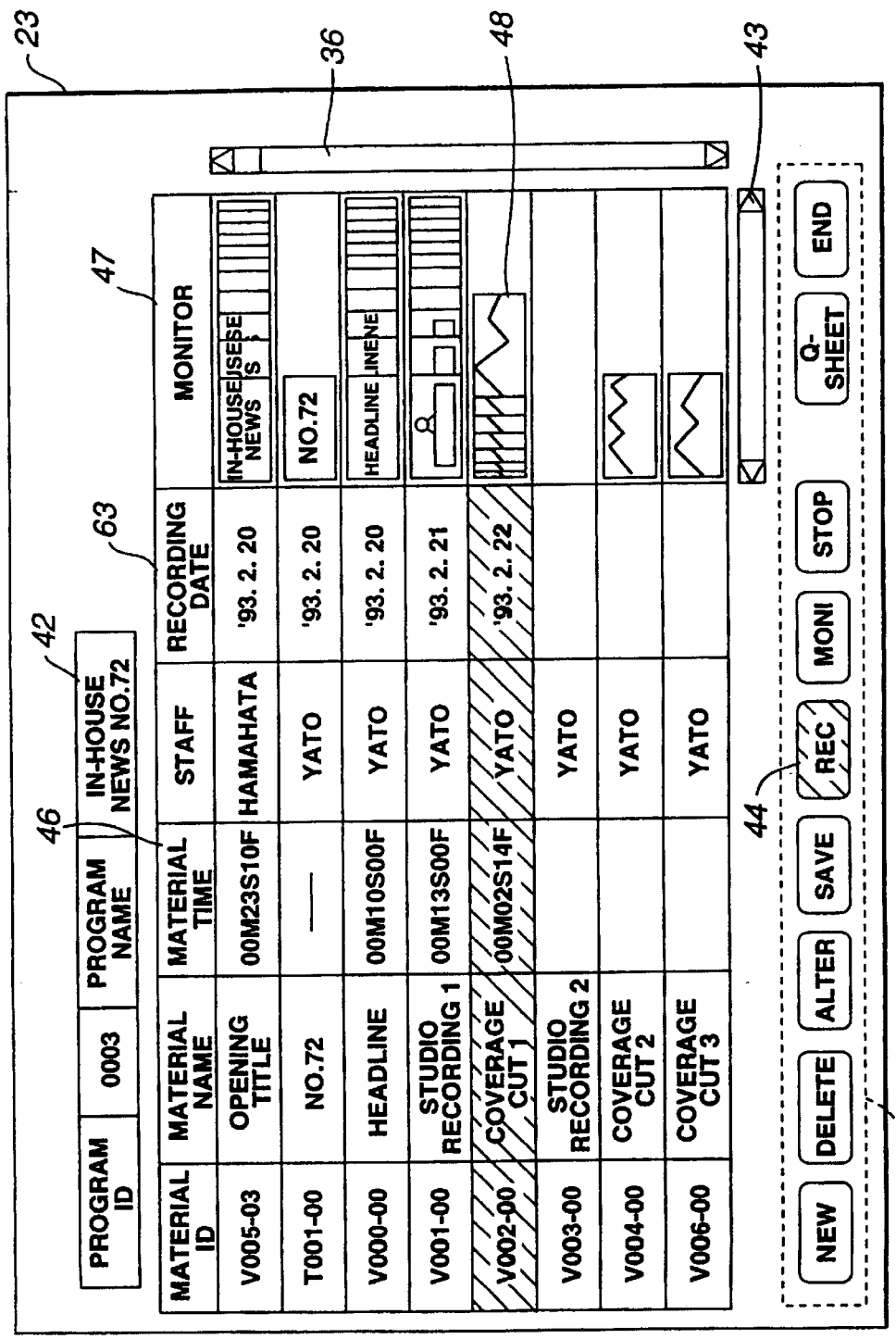
FIG. 8 is a view showing the program configuration screen in which a material is being recorded.

FIG. 8 shows the state that recording of each material classified by the material ID and the material name onto the HDD 12 of the video editing device 10 is being carried out in the program configuration screen 23.

In the material name display screen 63 of FIG. 8, in the monitor columns 47 of the materials of the material ID "V005-03" in the first row, the material ID "T001-00" in the second row, the material ID "V000-00" in the third row, and the material ID "V001-00" in the fourth row, images of the materials are displayed by overlook display. It is thus indicated that these materials are already recorded on the HDD 12. Since the material having the material ID "T001-00" in the second row is a still picture, a single image thereof is provided instead of overlook display.

The items of material time and recording time in the material name display screen 63 are items to be inputted when a video material is recorded. Therefore, the recording time and the recording date of the materials corresponding to their respective material IDs and material names are displayed in the first to fourth rows in the material name display screen 63, as shown in FIG. 8. Since the material having the material ID "T001-00" in the second row of the material name display screen 63 is a still picture, the item of the material time is left blank with no display.

For recording a material, a row indicating a desired material registered in the material name display screen 63 is selected by operating the input operating section 18, and the "REC" button 44 of the operation menu 35 is selected by operating the input operating section 18. Thus, recording of the material is started.

In the example of FIG. 8, a material corresponding to the material ID "V002-00" and the material name "COVERAGE CUT 1" in the fifth row of the material name display screen 63 is selected and recorded. The "REC" button 44 is also highlighted in display with respect to the selected material, thus indicating that the corresponding row is selected. The material of the fifth row is being recorded, and its image is displayed by overlook display in the monitor column 47 so as to display the status of recording. Therefore, the status of recording of the video material may be known in real time. In the present embodiment, the overlook display of the image is provided by extracting an image every predetermined period from a series of images of the corresponding material and displaying the extracted images in an overlapping manner.

When recording of the material corresponding to the material ID in the fifth row of the material name display screen 63 is completed, all the images displayed by overlook display of the corresponding material appear in the monitor column 47 in the material name display screen 63 so that completion of recording of the video material and confirmation of the contents of the video material may be carried out. Before the material corresponding to the material ID is recorded on the HDD 12 of the video editing device 10, only frames referred to as index pictures are displayed as in the seventh and eighth rows of the material name display screen 63 shown in FIG. 8. However, during recording onto the HDD 12 by the above-described method or at the time of completion of recording, the images displayed by overlook display are shown in the monitor column 47 of the material name display screen 63.

Specifically, after the input to the material name display screen 63 of the program configuration screen 23 shown in FIG. 7 is completed, actual shooting of the material is carried out. When the material tape cassette 101 completed in shooting is inserted and reproduced in the digital VTR for reproduction 1, frames before and after the interval between materials and frames before and after a scene change (referred to as index pictures as described above) are displayed in the monitor column 47 of the program configuration screen 23, as in the seventh and eighth rows of FIG. 8, so that these frames are automatically displayed in a list. That is, only the index pictures corresponding to the material ID are first displayed in the monitor column 47 of the program configuration screen 23. This is because the shooting equipment has a function to record the above-described index pictures so that the index pictures are first reproduced by the digital VTR for reproduction 1. When recording onto the HDD 12 of the video editing device 10 is completed by the above-described operation, the images displayed by overlook display are displayed in the monitor column 47 of the program configuration screen 23.

As described above, only the material corresponding to the material ID displayed on the material name display screen 63 of the program configuration screen 23 may be automatically recorded onto the recording medium of the video editing device 10 by operating the "REC" button 44 of the operation menu 35. The recording medium used in the present embodiment is the HDD (hard disc drive) 12 as shown in FIG. 1. The reason the material corresponding to the material ID on the program configuration table may be thus recorded on the recording medium of the video editing device 10 is that the material and its material ID are associated with each other by recording the material ID in the cassette memory (memory in cassette or MIC) before actually shooting the material.

Specifically, the material ID is recorded in the MIC of the material cassette tape 101 immediately before shooting the material, and then, the actual material corresponding to the material ID is recorded on the tape of the material cassette tape 101 by a camera-loaded VTR or the like. Then, the material tape cassette 101 is inserted in the digital VTR for reproduction 1, and the information operated by the input operating section 18 is outputted to the memory read section 1b of the digital VTR for reproduction 1 through the editing control section 11. The material ID corresponding to the operated information is read out from the MIC by the memory read section 1b. Since information about the position on the tape where the actual material corresponding to the material ID is recorded is provided within the MIC, the actual material is searched and recorded onto the HDD 12.

Thus, only the material corresponding to the material ID may be recorded onto the HDD 12 by operating the input operating section 18 on the above-described program configuration screen 23 displayed on the display section 17. Recording of each material displayed on the program configuration screen 23 with respect to each program registered on the above-described program selection screen 22 may also be automatically carried out on the basis of the registered material ID displayed on the material name display screen 63.

Figure 9:
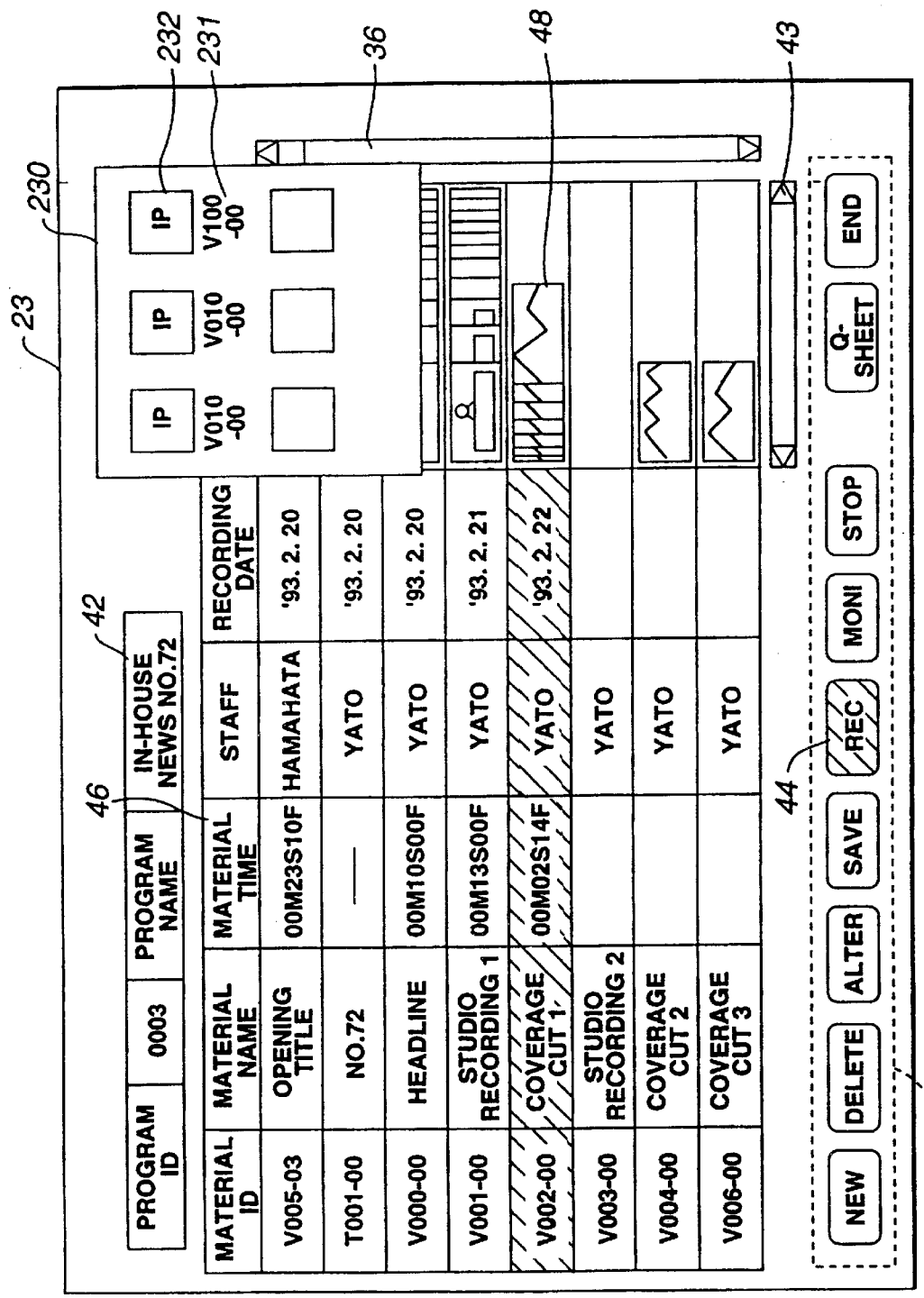
FIG. 9 is a view showing the program configuration screen in the case where a material is shot with a material ID appended thereto.
Figure 11:
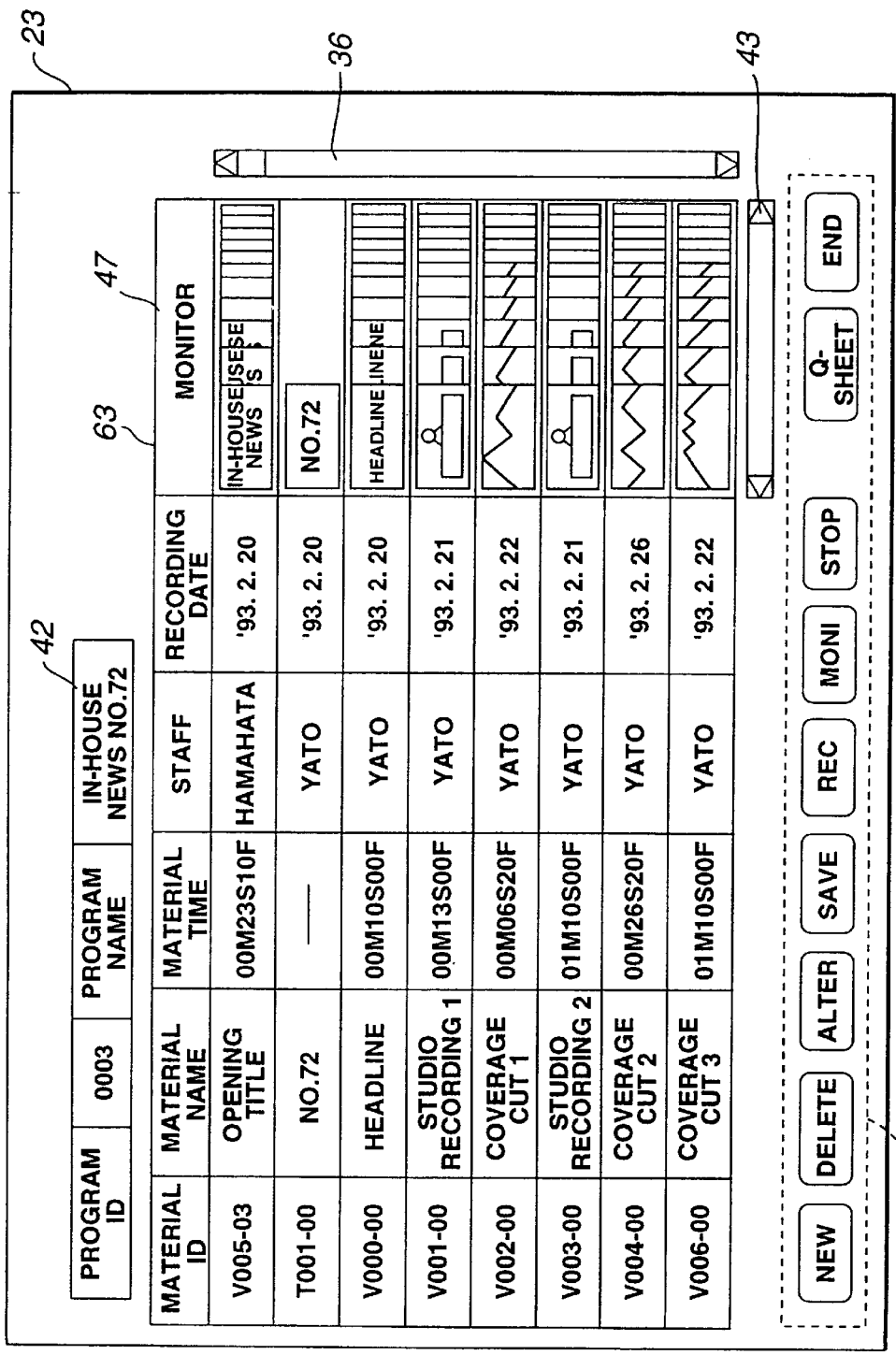
FIG. 11 is a view showing the program configuration screen in which recording of all materials has been completed.

Referring to FIG. 8, if a material is shot with a material ID appended thereto though there is no material corresponding to the material ID, a material selection screen 230 as shown in FIG. 9 is displayed on another window on the program configuration screen 23 at an arbitrary time point, for example, at a time point before recording the material corresponding to the each material ID onto the HDD 12 of the video editing device 10 using the program configuration screen 23. In this material selection screen 230, an index picture 232 is displayed with a material ID 23 1 appended thereto. The material ID 231 and the index picture 232 corresponding to the material ID 231 represent a material displayed on the material selection screen 230 with its material ID not being appended on the material name display screen 63 of the program configuration screen 23. When the material ID 231 on the material selection screen 230 is newly registered to the material ID on the material name display screen 63, the material automatically recorded onto the HDD 12 of the video editing device 10. The time point when the material selection screen 230 is displayed as another window on the program configuration screen 23 may be an arbitrary time point, for example, a time point when recording of a material ID registered on the program name display screen 63 onto the HDD 12 is completed (as shown in FIG. 11).

The material registered on the program configuration screen 23 is not entirely recorded at a time. The material which cannot be recorded is not recorded from the digital VTR for reproduction 1 onto the HDD 12 and is recorded onto the digital VTR for recording 5 through the HDD 12. This is because the HDD 12 has a limited recording capacity. For example, with respect to a material having a material time exceeding 15 minutes, which is displayed in the material time column 46 of the material name display screen 63, the material portion corresponding to the time up to 15 minutes is recorded on the HDD 12 and the remaining material portion exceeding 15 minutes is directly recorded on the digital VTR for recording 5 and displayed on the display section 17 through the editing control section 11 from the digital VTR for recording 5.

FIG. 10 shows the state that the material is monitored on the program configuration screen 23.

In the state shown in FIG. 10, recording of the materials is completed except for a material corresponding to a material ID "V004-00" and a material name "COVERAGE CUT 2" in the seventh row of the material name display screen 63. The incompletion of recording of the material corresponding to the material ID "V004-00" may be known from the blank material time column in the seventh row of the material name display screen 63 and the monitor column 47 where only the index picture (IP) is displayed.

For monitoring the recorded video material, the corresponding row in the material name display screen 63 is selected by operating the input operating section 18 in accordance with the material ID and the material name of the desired material, and the "MONI" button 51 of the operation menu 35 is selected by operating the input operating section 18, for example, clicking the mouse. In FIG. 10, the material ID "V002-00" and the material name "COVERAGE CUT 2" in the fifth row of the material name display screen 63, and the "MONI" button 51 of the operation menu 35 are highlighted in display. Thus, it is indicated that the material in this row and the "MONI" button are selected.

For monitoring the selected video material, images of the corresponding material displayed by overlook display in the monitor column 47 are displayed entirely with the lapse of time. In FIG. 10, a video material 52 corresponding to the material ID "V002-00" in the fifth row (the highlighted row) of the material name display screen 63 is entirely displayed in a sequential manner. Since the image sequentially shifts in accordance with the progress of recording to the video editing device 10, the position of the monitored video may be known in real time. The status of video monitoring is indicated by the position of a scroll button 43a of the monitor scroll bar 43.

FIG. 11 shows the state that recording of each material displayed on the program configuration screen 23 to the video editing device 10 is completed.

The completion of recording of all the materials may be known from the overlook display of the images corresponding to each material in the monitor column 42 in the material name display screen 63 and the display of the material time of each video material in the "MATERIAL TIME" column in the material name display screen 63. Since the material corresponding to the material ID "T001-00" and the material name "NO. 72" in the second row is a still picture, the "MATERIAL TIME" column is blank.

The editing screen 24 will now be described.

The editing screen 24 is adapted for carrying out editing of a video material recorded to the video editing device 10 through the above-described program configuration screen 23 and an audio material corresponding to the video material, for example, setting of special effects of the video material, setting of DSK, trimming, and recording and mixing of the audio material.

The editing screen 24 may be opened from the program configuration screen 23 by selecting the "Q-SHEET" button of the operation menu 35 in the program configuration screen 23 by operating the input operating section 18, for example, clicking the mouse.

Figure 12:
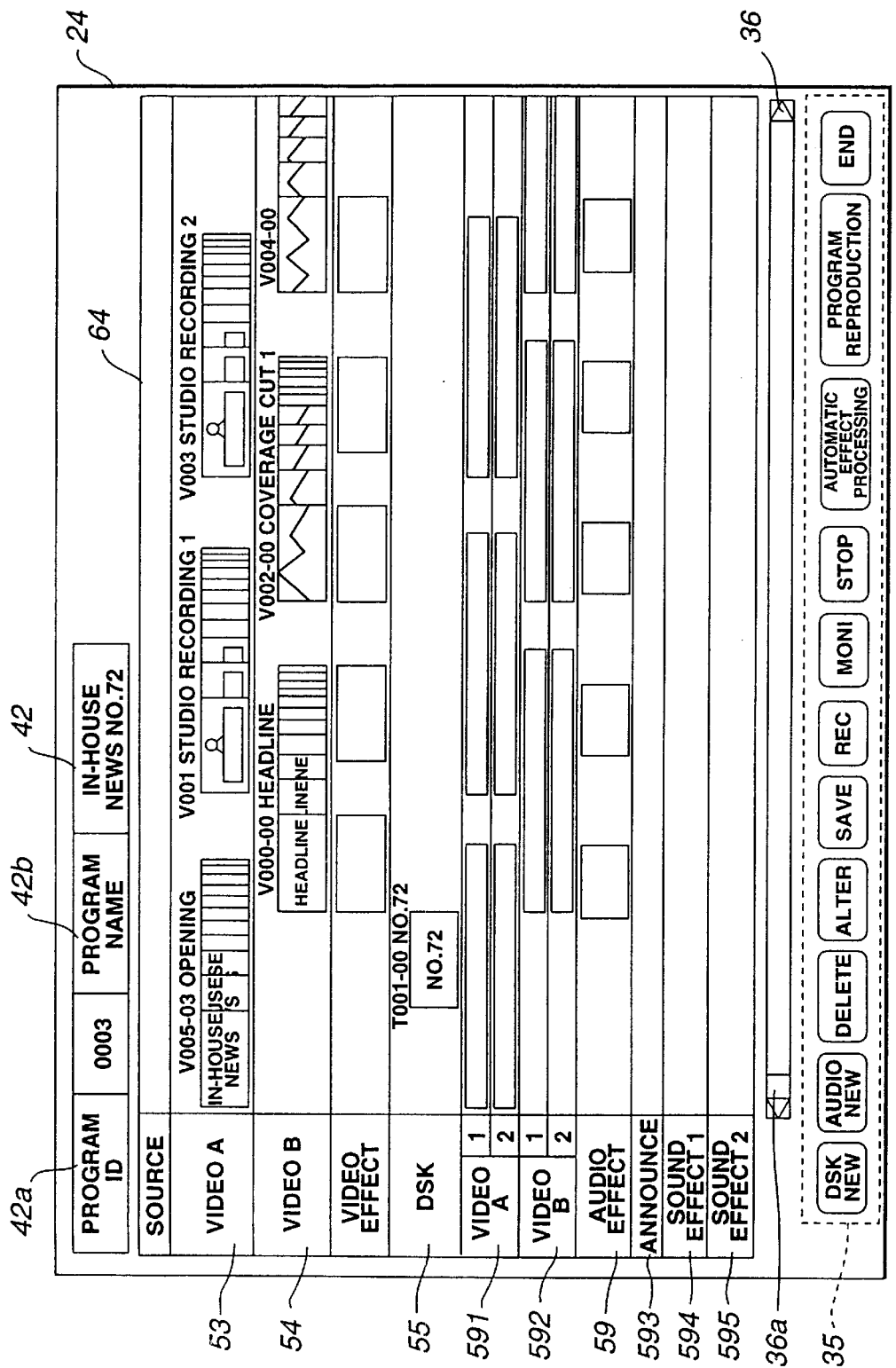
FIG. 12 is a view showing an editing screen before effect setting.

The editing screen 24 includes a program display section 42, a source name display screen 64, an operation menu 35, and a scroll bar 36, as shown in FIG. 12.

The program display section 42 has the same constitution as the program display section 42 in the program configuration screen 23, and the same contents as those of the program display section 42 of the program configuration screen 23 are displayed in this section. That is, the program display section 42 is displayed on the uppermost part of the editing screen 24 and includes a program ID 24a and a program name 24b.

The source name display screen 64 includes 11 items of "SOURCE", "VIDEO A" 53, "VIDEO B" 54, "VIDEO EFFECT", "DSK (digital still keying)" 55, "VIDEO A" (further divided into first and second rows), "VIDEO B" (further divided into first and second rows), "AUDIO EFFECT", "ANNOUNCE", "SOUND EFFECT 1", and "SOUND EFFECT 2" sequentially from top to bottom in the leftmost column. These 11 items will be later described in detail.

The operation menu 35 is displayed on the lowermost part of the editing screen 24, and includes 11 buttons of "DSK NEW", "AUDIO NEW", "DELETE", "ALTER", "SAVE", "REC", "MONI", "STOP", "AUTOMATIC EFFECT PROCESSING", "PROGRAM REPRODUCTION", and "END" sequentially from left to right. These 11 buttons will be later described in detail.

The scroll bar 36 is displayed on the lower side of the source display screen 64. The scroll button 36a can be caused to scroll the source name display screen 64 in left and right directions by operating the input operating section 18.

The example shown in FIG. 12 is the editing screen 24 related to the program having the program ID "0003" and the program name "IN-HOUSE NEWS NO. 72".

In the "VIDEO A" row 53 and the "VIDEO B" row 54 of the source name display screen 64, the video material corresponding to each material is displayed by overlook display. Specifically, in the "VIDEO A" row 53, the video material displayed by overlook display corresponding to the material ID "V005-03" and the material name "OPENING TITLE" is displayed, and the material ID and the material name of this video material are displayed on the upper part of the video material. In addition, the video materials corresponding to the material IDs "V001-00" and "V003-00", and the material IDs and the material names corresponding to these video materials are displayed similarly. In the "VIDEO B" row 54, too, the material ID, the material name and the video material are displayed by overlook display similar to that in the "VIDEO A" row 53. Using the videos displayed in the "VIDEO A" row 53 and the "VIDEO B" row 54, video special effects are made as later described.

In FIG. 12, the material corresponding to the material ID "T001-00" and the material name "NO. 72" is displayed in the "DSK" row 55. In this "DSK" row 55, an image (still picture) for keying is displayed. Actual keying from this "DSK" row 55 will be described later.

In addition, on the source name display screen 64 of FIG. 12, "VIDEO A" 591, "VIDEO B" 592, "AUDIO EFFECT" 59, "ANNOUNCE" 593, "SOUND EFFECT 1" 594, and "SOUND EFFECT 2" 595 for audio processing are displayed.

In the VIDEO A row 591 and the VIDEO B row 592, audio materials corresponding to "VIDEO A" 53 and "VIDEO B" 54 are displayed, respectively. Level display of the audio material is made, or the audio material ID or audio material name is displayed. That is, in FIG. 12, the audio material is displayed in the VIDEO A row 591, corresponding to the video material name "OPENING TITLE" in the VIDEO A row 53, and the audio material is displayed in the VIDEO B row 592, corresponding to the video material name "HEADLINE" in the VIDEO B row 54. In the present embodiment, since there are two output channels of the audio material, the display of each of the VIDEO A row 591 and the VIDEO B row 592 is divided in two rows.

The AUDIO EFFECT row 59 displays an icon for setting a special effect of the audio material so that the audio effect is actually made. The audio effect will be described later.

In the ANNOUNCE row 593, the audio material recorded together with the video material at the time of shooting is not displayed, and an audio material which is generated with respect to the recorded video material by an announcer viewing the video material is displayed, if any. The display is made by level display or band display, which indicates post-recording.

The SOUND EFFECT 1 row 594 and the SOUND EFFECT 2 row 595 display any sound effects reproduced by the sound effect reproducing section 4 of FIG. 1. The display thereof is similar to that of ANNOUNCE 593.

The editing screen 24 shown in FIG. 12 is in a state before carrying out various effect processing.

The program display section 42, the source name display screen 64, the operation menu 35 and the scroll bar 36 in the editing screen 24 are thus described.

A method of setting a video special effect and a method of setting an audio effect using the editing screen 24 will now be described. First, the video special effect setting method will be described.

Figure 13:
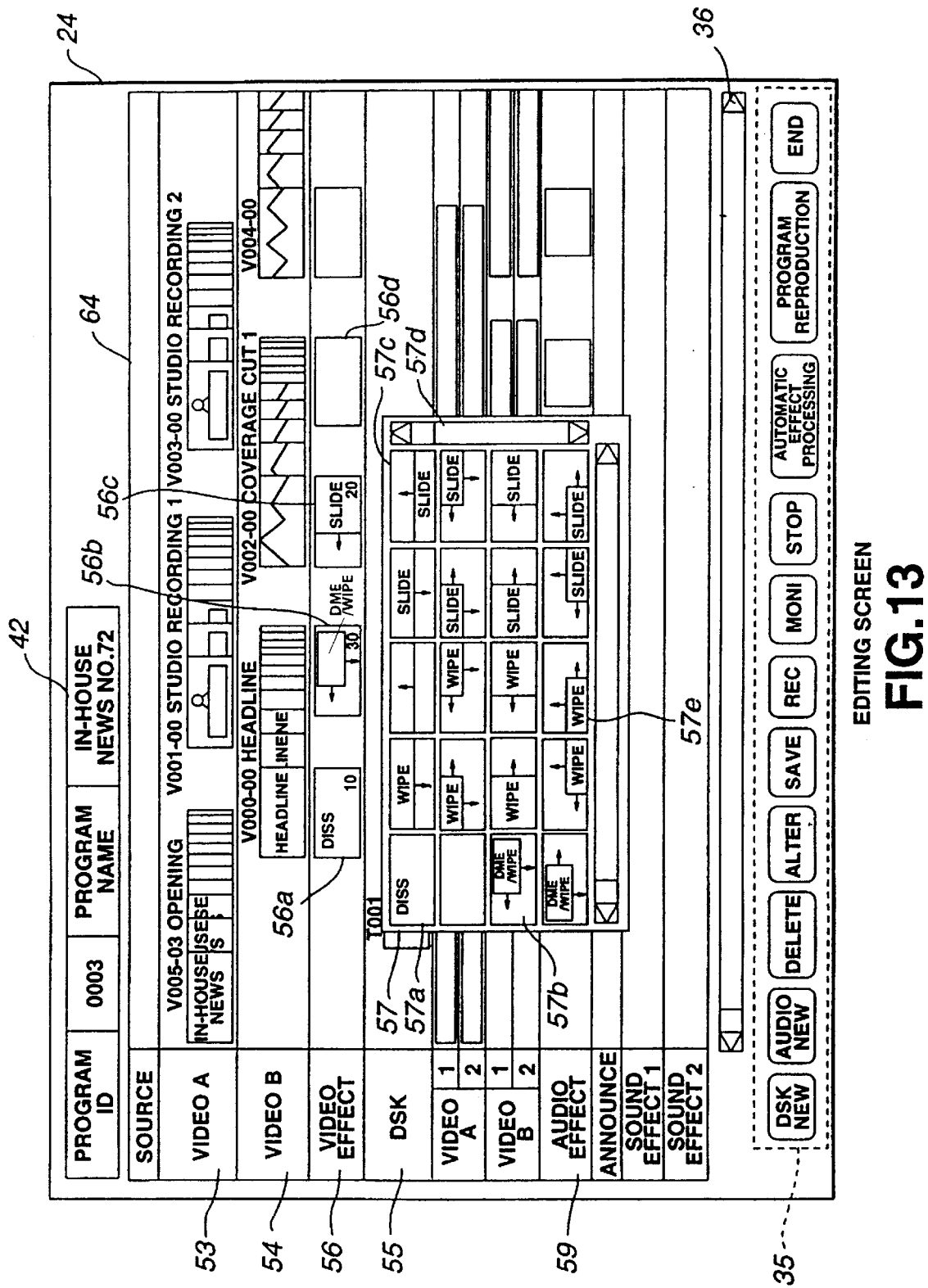
FIG. 13 is a view showing the editing screen in which effect pattern setting is being carried out.

FIG. 13 shows the state that setting of the video special effect is being carried out on the editing screen 24.

The setting of the video special effect is carried out in the VIDEO EFFECT row 56 of the source name display screen 64 in the editing screen 24. That is, when the special effect is not carried out, each icon displayed in the VIDEO EFFECT row 56 is blank like an icon 56d.

All the blank icons are shifted to the position where the special effect is intended to be carried out. Specifically, when dissolve processing is intended to be carried out so that the image of the material name "OPENING" gradually fades away while the next image of the material name "HEADLINE" gradually appears, a blank icon is shifted to the position of the first frame in the VIDEO B row 54 where the material name "HEADLINE" is displayed. That is, icons displayed in the VIDEO EFFECT row 56 is displayed in a time series from left to right, corresponding to the VIDEO A row 53 and the VIDEO B row 54.

Next, when the blank icon is shifted to the desired position, what type of special effect is to be made is determined. Specifically, as the blank icon is selected by operating the input operating section 18, for example, clicking the mouse, a video effect selection window 57 is displayed. The video effect selection window 57 shows icons indicating types of special effects, as shown in FIG. 13, and a rightmost scroll bar 57d and a lowermost scroll bar 57e in the window 57 can be caused to scroll the video effect selection window 57 by operating the input operating section 18, for example, clicking the mouse.

In this embodiment, the above-described dissolve processing effect is intended to be made at the position of an icon 56a in VIDEO EFFECT 56, between the material name "OPENING" and the material name "HEADLINE". Therefore, a dissolve processing icon 57a in the video effect selection window 57 is selected by operating the input operating section 18, for example, clicking the mouse, so that the blank icon in the VIDEO EFFECT row 56 turns into the icon 57a like the icon 56a of FIG. 13. That is, the special effect is set to carry out dissolve processing between the material name "OPENING" in VIDEO A and the material name "HEADLINE" in VIDEO B, at the position of the icon 56a in the VIDEO EFFECT row 56 of FIG. 13. By similar operation, at the position of an icon 56b and an icon 56c as displayed in the VIDEO EFFECT row 56 of FIG. 13, special effect displayed in the icons are made.

The icon 56d is left blank in FIG. 13. This indicates the state that what type of special effect is to be made is not determined and that no icon in the video effect selection window 57 is selected. Therefore, no special effect is made at this position.

In the video effect selection window 57, icons for making various effects are displayed other than the icon 57a for making the dissolve effect. In the case of FIG. 13, an icon 57b for performing multi-effector processing, an icon 57c for performing slide processing of an image, and an icon 57e for performing wipe processing of an image are displayed. As a matter of course, other icons for performing various special effect processing are displayed.

Figure 14:
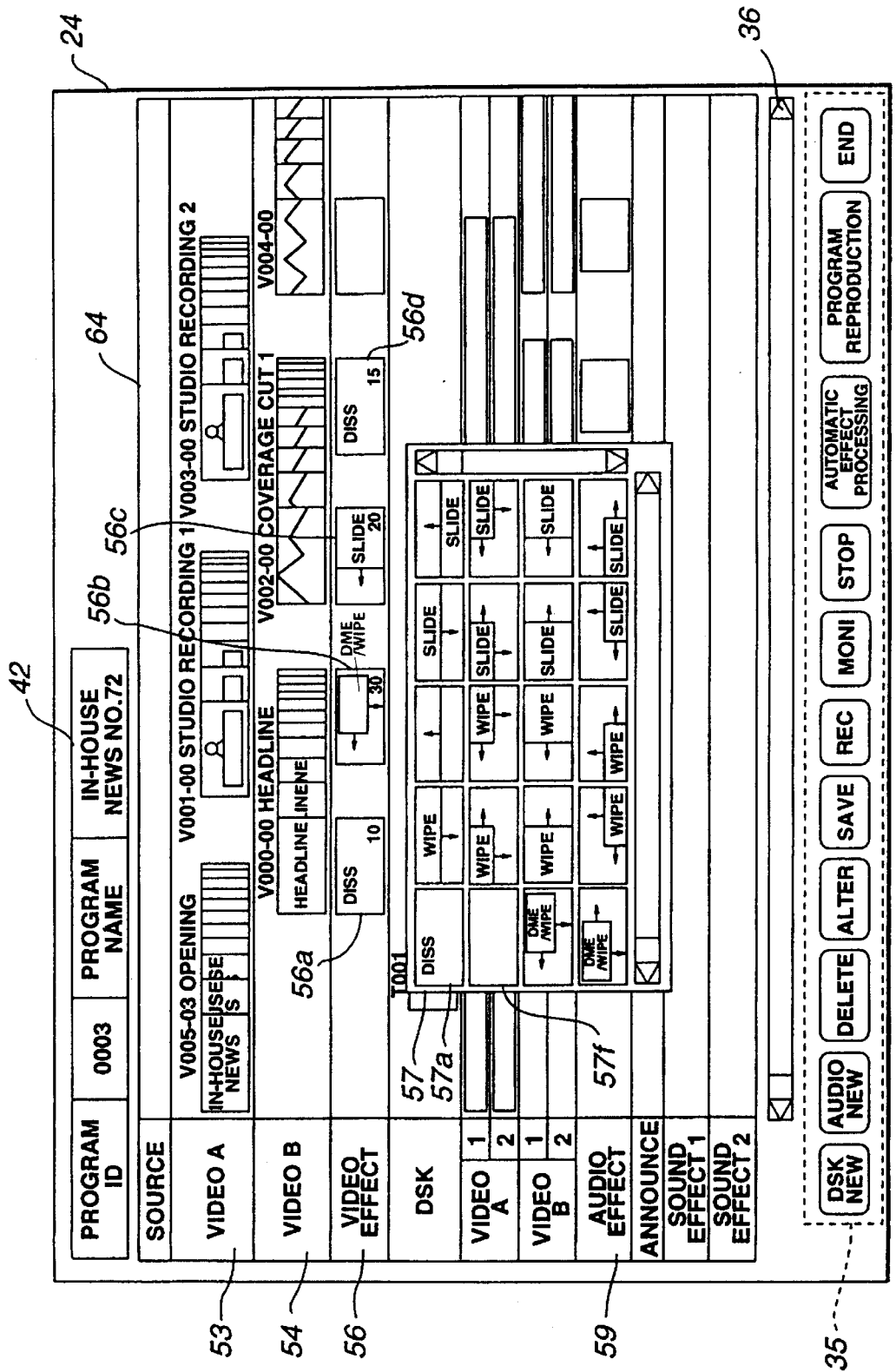
FIG. 14 is a view showing the editing screen in which effect time setting is being carried out.

Subsequently, time setting of the video material for the special effect is carried out. FIG. 14 shows the state that the effect time is being set.

The blank icon displayed in the VIDEO EFFECT row 56 in the source name display screen 64 becomes an icon indicating a special effect of the video effect selection window 57, and then, the input operating section 18 is operated, for example, "15" is inputted by the keyboard, so as to display the number of frames 15 on the lower part of the icon 56d in the VIDEO EFFECT row 56 of FIG. 14. This number of frames indicates the number of frames on which a video effect is to be made. With the icon 56d shown in FIG. 14, the dissolve processing between the video material names "STUDIO RECORDING 2" in VIDEO A 53 and "COVERAGE CUT 1" in VIDEO B 54 is carried out at the position indicated in FIG. 14 on the previous 15 frames (in this case, the material name "COVERAGE CUT 1") so that the image is dissolved to the image of the material name "STUDIO RECORDING 2". In the case where the effect time is not set, the effect time is determined by predetermined time setting.

An editing point input method will now be described, in which an editing point of the video material on which a video special effect should be made is inputted so as to make the video special effect.

Figure 15:
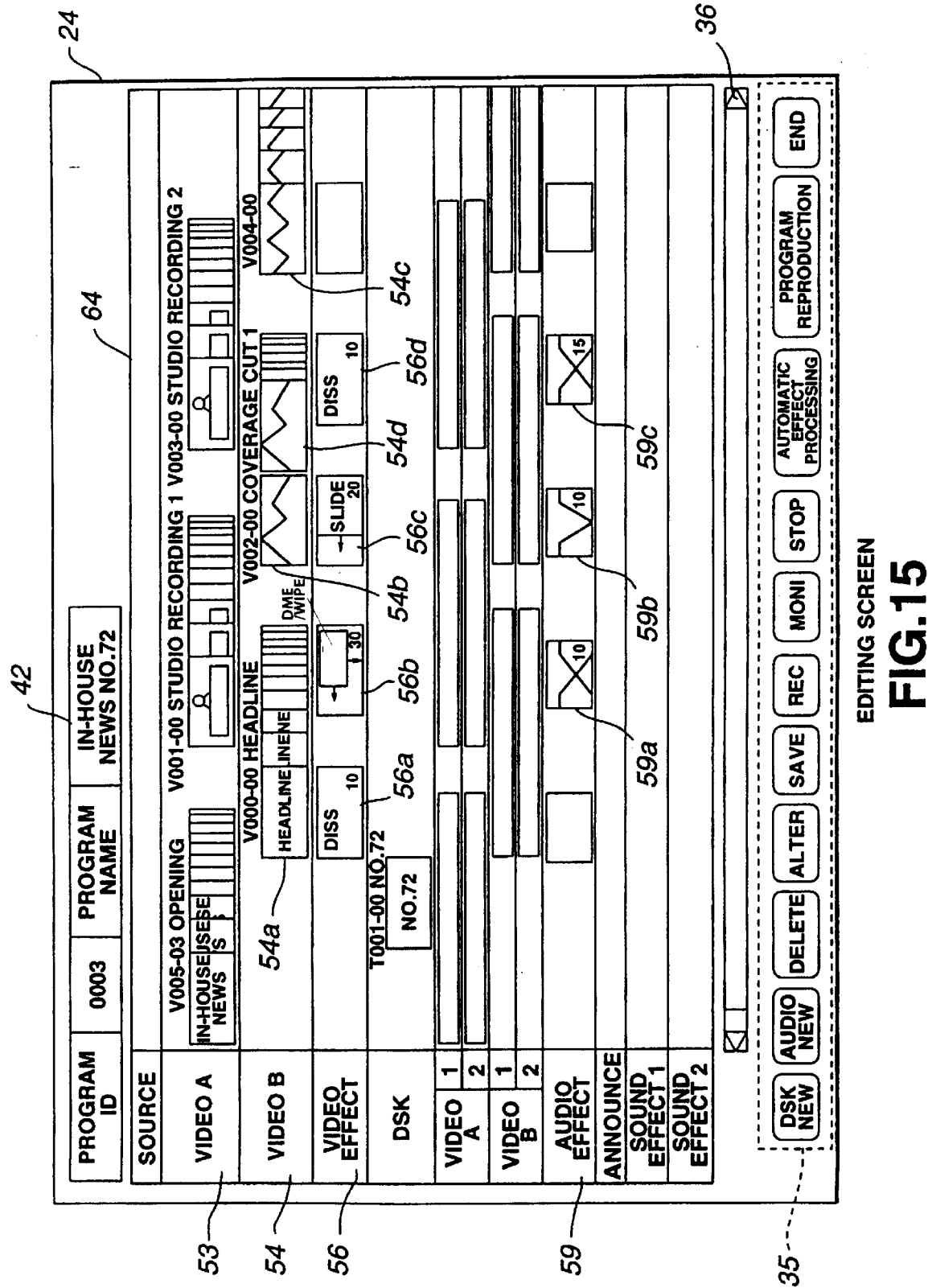
FIG. 15 is a view showing the editing screen in which input of an editing point is being carried out.

FIG. 15 shows the editing screen 24 in the state that an editing point is being inputted.

Figure 16:
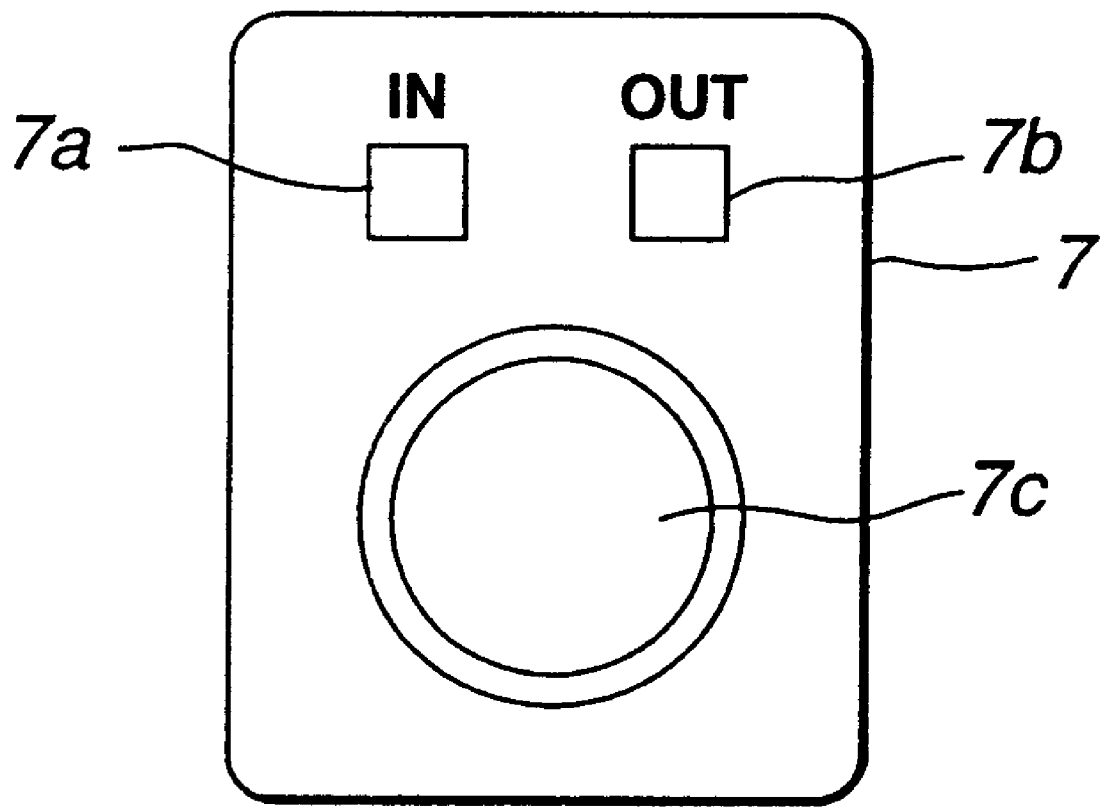
FIG. 16 is a schematic view showing a jog/shuttle dial.

The input of an editing point is carried out by operating a part of the input operating section 18 which is referred to as a jog/shuttle dial shown in FIG. 16, or a display on the editing screen 24 or on a screen different from the editing screen 24. In the following description, a part of the input operating section 18 is operated. The details of this operation will be described later.

First, when an image displayed by overlook display in the VIDEO A row 53 or the VIDEO B row 54 of the source name display screen 64 on the editing screen 24 shown in FIG. 15 is selected by operating the input operating section 18, for example, clicking the mouse, the jog/shuttle dial 7 shown in FIG. 16 becomes effective. The jog/shuttle dial 7 shown in FIG. 16 includes an in-button 7a, an out-button 7b, and a dial 7c. The dial 7b is a so-called jog dial and shuttle dial.

By operating this dial 7c of the jog/shuttle dial 7, the position of an image on which a special effect is to be made is adjusted. For example, with respect to the material name "COVERAGE CUT 1" 54b in VIDEO B 54 on the editing screen 24 of FIG. 15, the position of the video material 54d which is currently selected and displayed entirely may be operated by the dial 7c of the jog/shuttle dial 7. Specifically, the position where a special effect is to be made with respect to the video material indicated by the material name "COVERAGE CUT 1" may be adjusted by rotating the dial 7c to the left or to the right. That is, an in-point of the video material on which the special effect is to be made (the first frame on which the special effect is to be made) is determined by rotating the dial 7c to move the image indicated by the video material name "COVERAGE CUT 1" in VIDEO B 54 and pressing the in-button 7a of the jog/shuttle dial 7 at an appropriate position. Similarly, an out-point (the last frame on which the special effect is to be made) is determined by pressing the out-button 7b of the jog/shuttle dial 7.

The method of inputting the video editing point for the special effect by operating the jog/shuttle dial 7 is described above. In the above-described example, the jog/shuttle dial 7 is a part of the input operating section 18. It may also be considered that a window displaying the jog/shuttle dial 7 is displayed on the editing screen 24 or on another screen. In such case, the in-button 7a, the out-button 7b and the dial 7c are selected or rotated by operating the input operating section 18, for example, clicking the mouse, so that the input of the editing point may be realized similarly to the above-described example.

The special effect setting method for the video material by utilizing the editing screen 24 is described above.

A method of setting an audio effect on an audio material will now be described.

Figure 17:
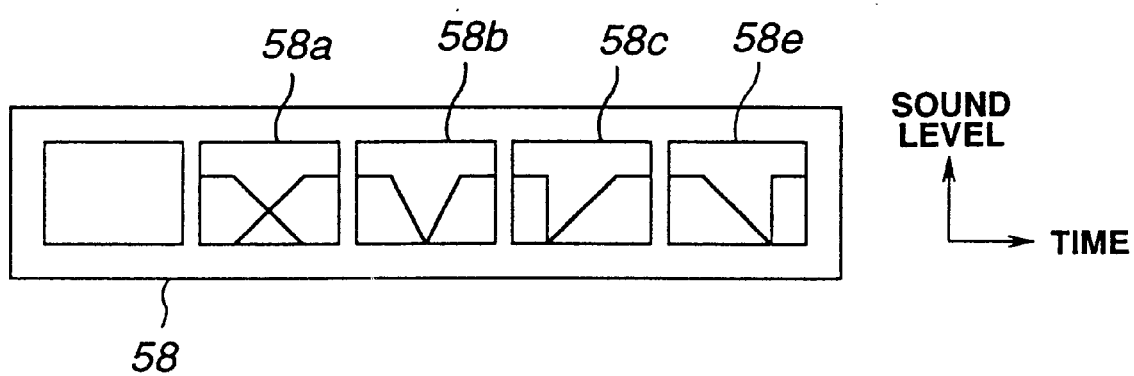
FIG. 17 is a view showing an audio effect window.

An audio effect on an audio material is made in the AUDIO EFFECT row 59. Similar to the operation in VIDEO EFFECT 56 on the video material, a blank icon is selected and moved to a position where an audio effect is to be made, by operating the input operating section 18, for example, clicking the mouse. As the blank icon at this position is selected by operating the input operating section 18, for example, clicking the mouse, an audio effect window 58 shown in FIG. 17 is displayed as another window on the editing screen 24. In this audio effect window 58, as a desired audio effect icon is selected, the selected audio effect icon is displayed in the blank icon as displayed in the AUDIO EFFECT row 59 of FIG. 18. The audio effect window 58 shown in FIG. 17 displays audio effect icons 58a, 58b, 58c and 58d for cross-fading. The vertical axis of each audio effect icon corresponds to the audio level, and the horizontal axis corresponds to the time. The display of a function corresponds to an audio material at an out/in-point.

When the selected audio effect icon is displayed in AUDIO EFFECT 59, the effect time is set similarly to the operation for the video special effect. For setting the effect time, the input operating section 18 is operated, for example, the numeral "10" is inputted by the keyboard, similarly to the setting of the effect time of the video special effect, so that an audio effect indicated by the audio effect icon is made on the audio material of the video material of preceding and succeeding five frames. When the effect time is not operated by the operation of the input operating section 18, the audio effect is made on the audio material corresponding to a predetermined number of frames.

The above-described video special effect setting method and audio effect setting method are carried out as follows. That is, the video material recorded on the video editing device 10 is stored in the video special effect unit 16 from the HDD 12 under the command from the editing control section 11 by the above-described series of operations on the editing screen 24 displayed on the display section 17. The actual special effect such as dissolve processing is made by the video special effect unit 16, and the processed video material is recorded again on the HDD 12. Also, the audio material recorded on the video editing device 10 is stored in the audio mixer 15 from the HDD 12 under the command from the editing control section 11 by the above-described series of operations on the editing screen 24 displayed on the display section 17. The actual audio effect is made by the audio mixer 15, and the processed audio material is recorded again on the HDD 12.

Figure 18:
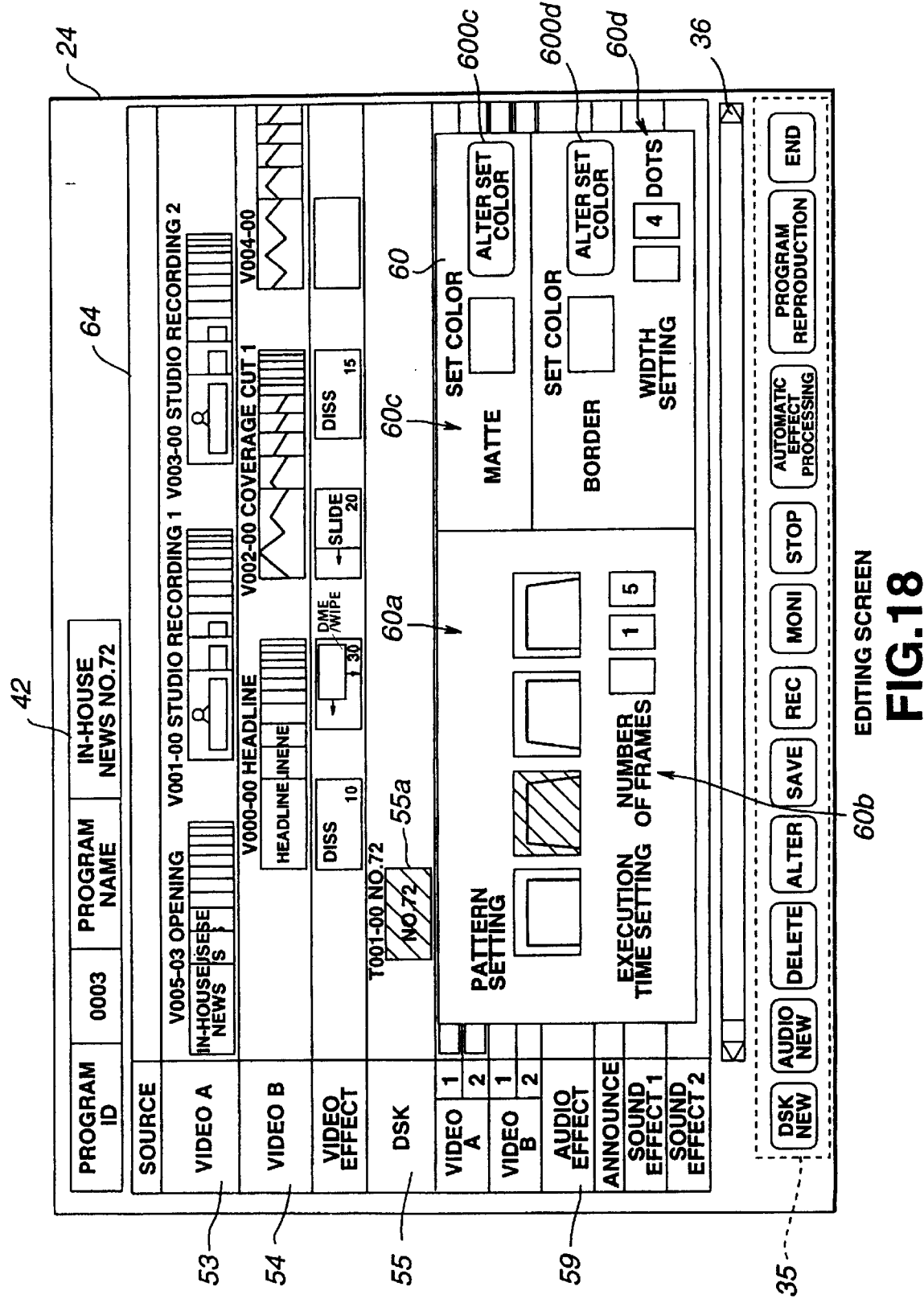
FIG. 18 is a view showing the editing screen in which setting of a DSK (digital still keying) effect is being carried out.

Keying processing of the video material as shown in FIG. 18 will now be described.

Keying processing is processing for changing the color of a background or a line of a still picture or a frame. A method of setting a video keying effect will now be described.

First, in the source name display screen 64 on the editing screen 24, a DSK material 55a displayed in the DSK (digital still keying) row 55 is selected by operating the input operating section 18, for example, clicking the mouse. When the DSK material 55 is selected, a DSK effect setting window 60 is displayed on the editing screen 24. In this DSK effect setting window 60, the setting necessary for keying processing is carried out. The DSK effect setting window 60 includes a pattern setting section 60a, an execution time setting section 60b, a mat color setting section 60c, and a border color setting section 60d, as shown in FIG. 18.

The pattern setting section 60a is adapted for setting a keying effect pattern. Each pattern is displayed as an icon, with the vertical axis representing the keying level and the horizontal axis representing the time. A desired pattern is selected by operating the input operating section 18, for example, clicking the mouse. As the execution time setting section 60b, an execution time for carrying out keying processing is displayed below the icon displaying each pattern, and is set by operating the input operating section 18, for example, inputting a numeral by the keyboard.

The mat color setting section 60c is adapted for setting the color of a predetermined region of a video region, mainly, the background of the image. Specifically, when a set color alter button 600c of the mat color setting section 60c is selected by operating the input operating section 18, a color setting window, not shown, is displayed on the DSK effect setting window 60. This color setting window displays icons of various colors, and when a desired color is selected by operating the input operating section 18, the selected color is displayed in the set color section of the mat color setting section 60c.

The border color setting section 60d is adapted for setting the color of a region, mainly, the line of the image. Specifically, similar to the operation of the mat color setting section 60b, a "SET COLOR ALTER" button of the border color setting section 60d is operated and a desired color is selected from a color setting window. Also, the width of the border is set in this section. In the example shown in FIG. 17, the width of the border is four dots.

Trimming at a position for carrying out keying processing is carried out by the jog/shuttle dial 7, which is used for inputting the editing point in the above-described video special effect. Specifically, in the case where keying processing is to be carried out on the material of the material name "OPENING", a desired frame in VIDEO A 53 on the editing screen 24 is selected by the dial 7c, and the in-button 7a of the jog/shuttle dial 7 is operated.

If the configuration of the program is altered, the trimming state of the material is returned to the initial state.

The case where additional setting of key processing is carried out on the editing screen 24 will now be described with reference to FIG. 19.

Figure 19:
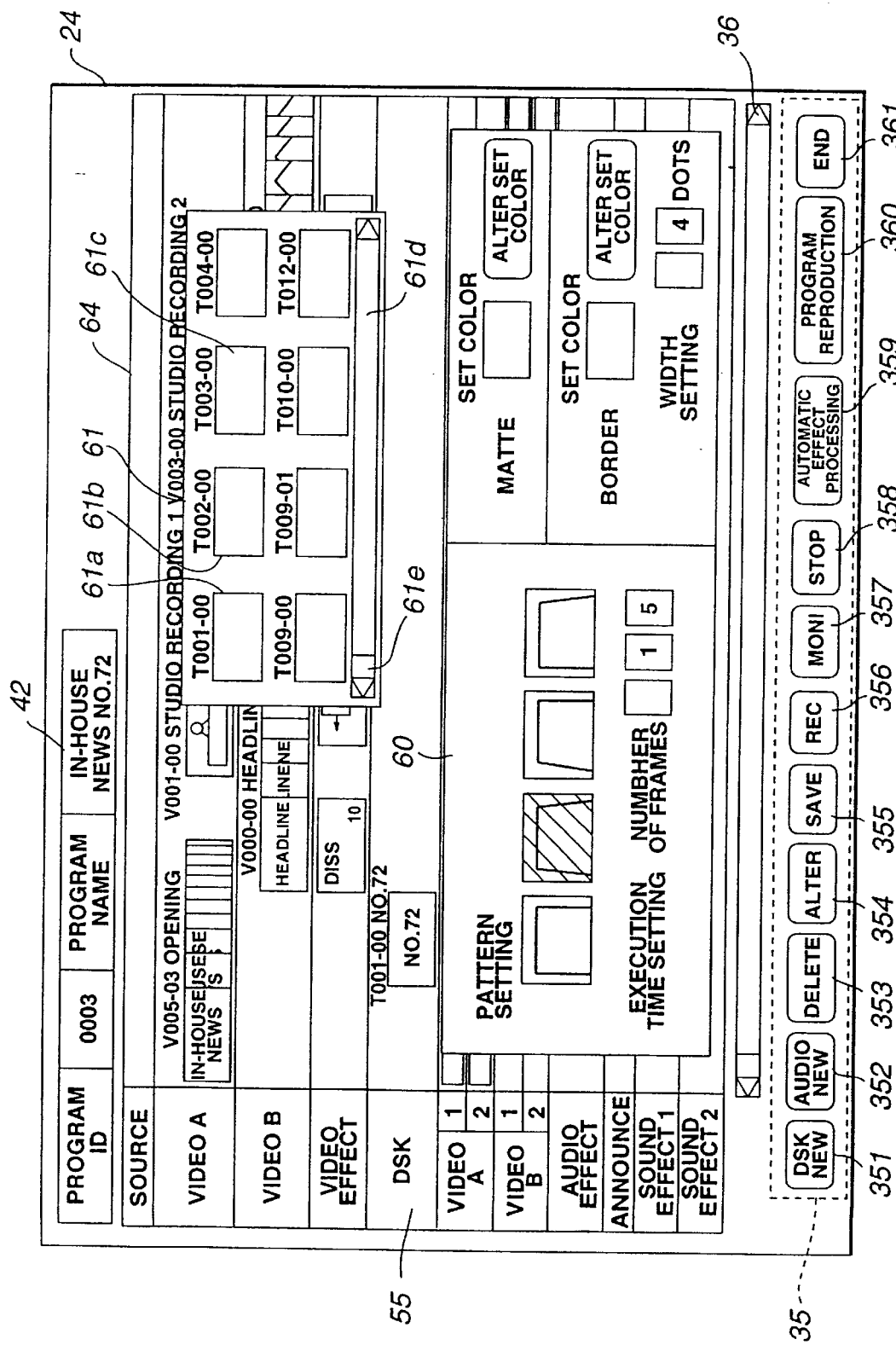
FIG. 19 is a view showing the editing screen in which additional setting of the DSK (digital still keying) effect is being carried out.

In the source name display screen 64 on the editing screen 24, as the "DSK NEW" button 351 of the operation menu 35 is selected by operating the input operating section 18, a DSK material window 61 shown in FIG. 19 is displayed. In the DSK material window 61, an image (still picture) different from the material displayed on the DSK row 55 is displayed as an icon. When one of the icons is selected by operating the input operating section 18, the icon is newly displayed in the DSK row 55 so that the above-described operation of keying processing may be carried out on the selected new icon, that is, the new material.

The DSK material window 61 displays the above-described image as an icon. In FIG. 19, DSK materials such as a material ID "T001-00" and an icon display 61a of an image (still picture) indicated by the material ID, and a material ID "T002-00" and an icon display 61b of an image (still picture) indicated by the material ID are displayed in a list. A scroll bar 61d is displayed on the lowermost part of the DSK material window, and a button 61e can be caused to scroll the DSK material window 61 on this window screen by operating the input operating section.

In the DSK material window 61 thus constituted, an image (still picture) as a new target of keying processing may be inserted in the DSK row 55 as follows. That is, when the "DSK NEW" button 351 of the operation menu 35 is selected on the editing screen 24 by operating the input operating section 18, the DSK material window 61 is displayed. A desired icon is selected from the icons displayed in the DSK material window 61 on the editing screen 24 by operating the input operating section 18, and a position where keying processing is intended to be executed is selected in the DSK row 55 in the source name display screen 64 on the editing screen 24 by operating the input operating section 18. Thus, the selected icon is inserted in this position. After the icon is inserted, as the DSK material icon is selected on the editing screen by operating the input operating section 18, the DSK setting window 60 is displayed so that the effect pattern, the execution time, the mat color and the border color are set. The setting in the DSK setting window 60 is carried out by the same method as the above-described setting method for keying processing.

When the DSK material icon set in the DSK row 55 in the source name display screen 64 is selected by operating the input operating section 18 and then the "DELETE" button 353 of the operation menu 35 is selected, the icon is deleted from the DSK row 55. The keying processing and additional setting for keying are described above.

Figure 20:
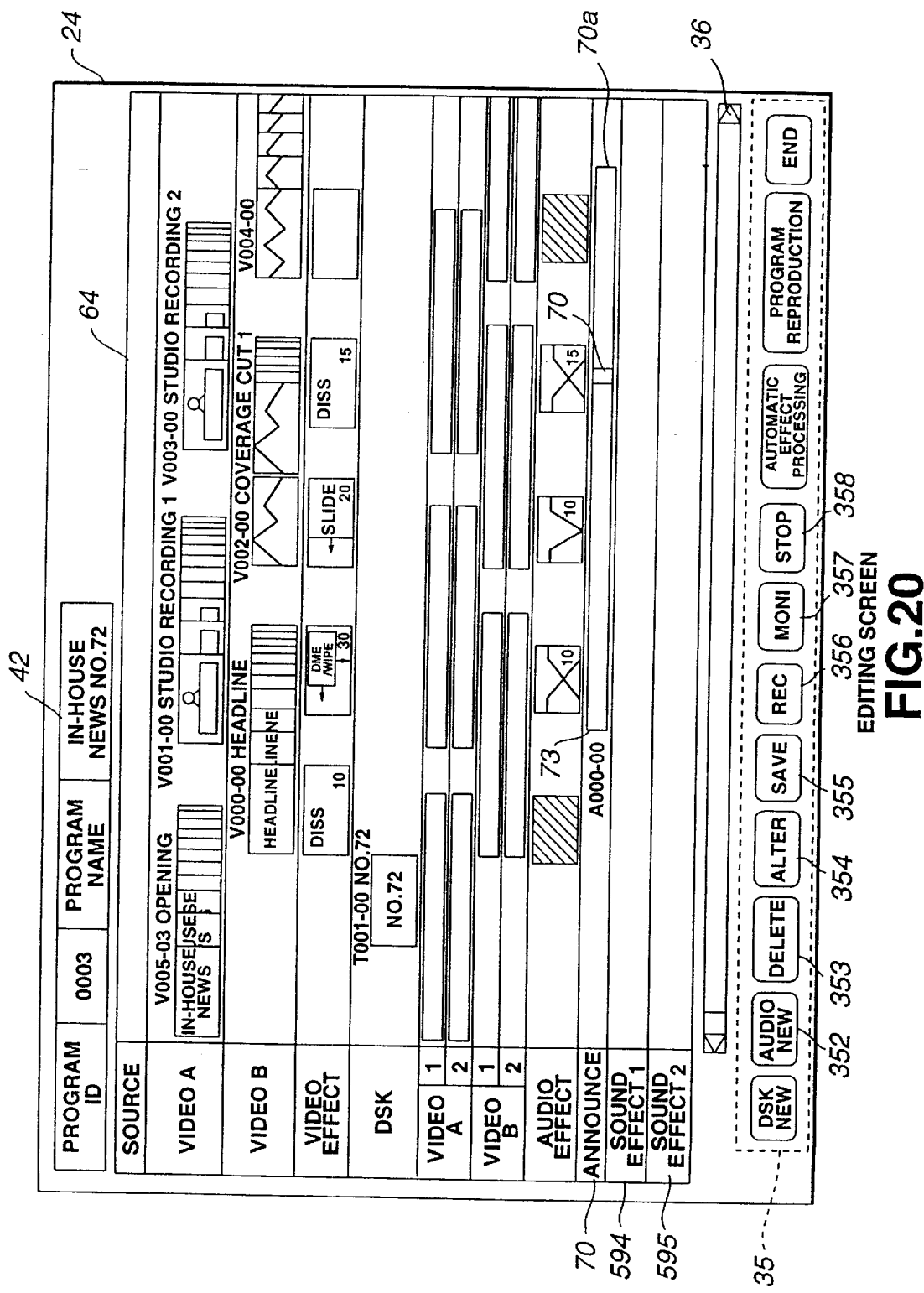
FIG. 20 is a view showing the editing screen in which audio recording/monitoring is being carried out.

Recording/monitoring of audio materials other than the audio material recorded together with the video material at the time of shooting, and various other operations will now be described with reference to FIG. 20.

For recording audio materials, the "AUDIO NEW" button 352 of the operation menu 35 on the editing screen 24 is first selected by operating the input operating section 18, and a track of an audio material to be recorded is selected. The track of the audio material to be recorded is the ANNOUNCE row 70, the SOUND EFFECT 1 row 594, or the SOUND EFFECT 2 row 595 in the source name display screen 64. In the example shown in FIG. 20, the ANNOUNCE row 70 is selected. Then, a recording start position is selected by operating the input operating section 18. The audio material to be recorded is selected by operating the input operating section 18 and the position of the selected track is selected, thereby determining the recording start position. In this case, an audio material ID "A000-00" is selected, and this audio material is started at the start position of the video material having the material name "STUDIO RECORDING 1". Also, the above-described jog/shuttle dial 7 is made effective by operating the input operating section 18, and the leading portion of the audio material displayed on the track may be searched by operating the dial 7c. By selecting the "REC" button 356 of the operation menu 35, the actual audio material is recorded onto the HDD 12 of the video editing device 10. Recording of the audio material may be confirmed as a waveform indicating the audio level is displayed on the selected track of the audio material on the editing screen and as the sound is outputted from a speaker, not shown, provided in the video editing device 10. On completion of necessary audio recording, recording of the audio material is ended by selecting the "STOP" button 358 of the operation menu. For monitoring the recorded audio material, a track on which a desired sound is displayed is selected by operating the input operating section 18 and the "MONI" button 357 of the operation menu 35 is selected so that the sound is reproduced and outputted from the speaker, not shown. The position of the track of the audio material which is being reproduced is displayed by highlighting or by a cursor. When monitoring of the audio material is intended to be stopped, the "STOP" button 358 of the operation menu 35 is selected.

Material IDs are automatically appended to all the audio materials. If the material ID of the audio material is intended to be changed, a desired audio material is selected by operating the input operating section 18 and the "ALTER" button 354 of the operation menu 35 is selected. Then, a material ID is inputted by operating the input operating section 18, thus enabling change of the material ID. After the material ID is changed, the alter information is saved by selecting the "SAVE" button 355 of the operation menu 35.

Also, similar to the trimming of the video material, trimming of all the audio materials may be carried out by operating the jog/shuttle dial 7. Specifically, as an audio material for trimming is selected by operating the input operating section 18 after recording the audio materials, the above-described jog/shuttle dial 7 becomes operable. By operating the in-button 7a and the out-button 7b of the jog/shuttle dial 7, an in-point and an out-point of the audio material are set, respectively. After that, as the "SAVE" button 355 of the operation menu 35 is selected by operating the input operating section 18, the trimmed audio material is recorded. The material ID of the trimmed audio material is automatically changed to an ID which is different from the material ID before trimming. To return the trimmed audio material to the original audio material, a desired audio material displayed on the editing screen 24 is selected, and the "ALTER" button 354 of the operation menu 35 is selected so as to return the material ID to the original ID.

To delete the audio material, an audio material to be deleted, displayed on the editing screen 24, is selected and the "DELETE" button 353 of the operation menu 35 is selected.

If the program configuration itself is intended to be altered, the trimmed audio material is. returned to the audio material before trimming, that is, the initial state.

The recording, monitoring, and various other operations of the audio material are described above.

The material screen 25 shown in FIG. 21 will now be described.

A material displayed on the material screen 25 is a material shot and recorded with a material ID which is not registered in advance on the program configuration screen 23 before shooting. Such material is managed on this material screen 25.

Figure 21:
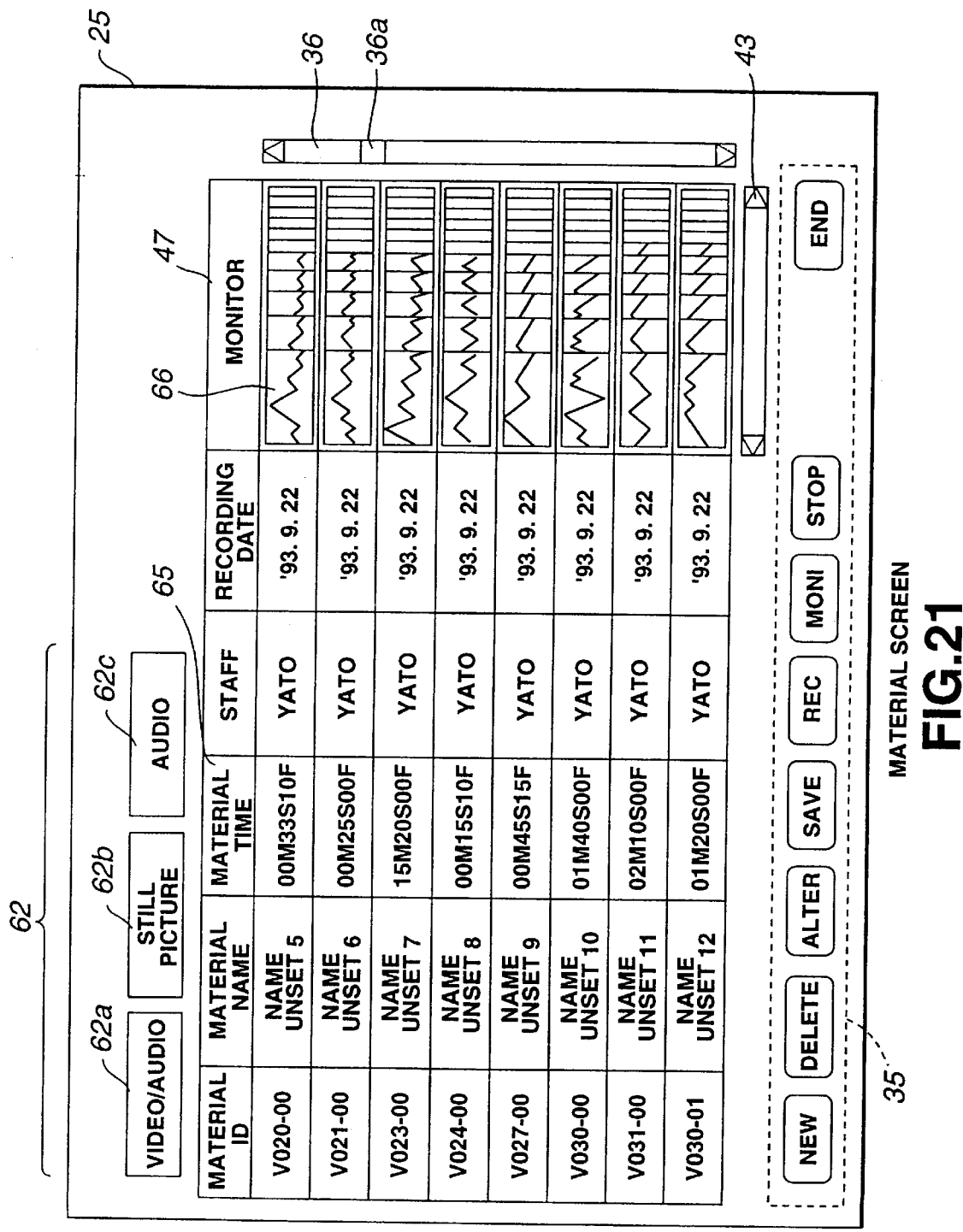
FIG. 21 is a view showing a material screen.

As shown in FIG. 21, the material screen 25 includes material type selecting buttons 62, a material name display screen 65, an operation menu 35, a scroll bar 36, and a monitor scroll bar 43.

The material type selecting buttons 62 include a "VIDEO/AUDIO" button 62a, a "STILL PICTURE" button 62b, and an "AUDIO" button 62c. The "VIDEO/AUDIO" button 62a is adapted for switching a screen displayed on the material screen 25 to a screen showing a video material and an audio material recorded together with the video material. The material screen 25 shown in FIG. 21 displays video materials and audio materials recorded together with the video materials. In this screen, when the "STILL PICTURE" button 62b is selected on the material screen 25 by operating the input operating section 18, the screen is switched to a material screen on which a still picture material is displayed. On the other hand, when the "AUDIO" button 62c is selected on the screen shown in FIG. 21, the screen is switched to a material screen on which an audio material is displayed.

The material name display screen 65 has the similar configuration as the material name display screen 63 of the program configuration screen 23. In the material name display screen 65, as shown in FIG. 21, "MATERIAL ID", "MATERIAL NAME", "MATERIAL TIME", "STAFF", "RECORDING DATE", and "MONITOR" are displayed, and the material ID, the material name, the time for recording the material to the editing device, the staff member of the material, the date on which the material was recorded, and the actual material are displayed in each row with respect to each material ID. In the "MONITOR" column, similar to the monitor column 47 of the program configuration screen 23, overlook display of an image with respect to a video material or level display with respect to an audio material is displayed.

The operation menu 35 includes eight buttons of "NEW", "DELETE", "ALTER", "SAVE", "REC", "MONI", "STOP", and "END", sequentially from the left on the material screen 25. Similar to the buttons of the operation menu 35 of the program configuration screen 23, these buttons are adapted for registering a new material, deleting a registered material, altering each item of a registered material, saving an item and a material after alteration, recording a material onto the HDD 12 as a recording material of the editing device 10, monitoring a recorded material, stopping recording and monitoring, and ending the material screen 25, respectively.

The scroll bar 36 is provided on the right side of the material name display screen 65, and a scroll button 36a of scroll bar 36 can be caused to scroll up and down the material screen 25 by operating the input operating section 18.

The monitor scroll bar 43 is provided on the lower side of the monitor column 47 of the material screen 45 and enables scrolling the material displayed in the monitor column 47 to left and right.

In the example shown in FIG. 21, since all the images are displayed by overlook display in the monitor column 47, recording of all the video materials is completed.

Figure 22:
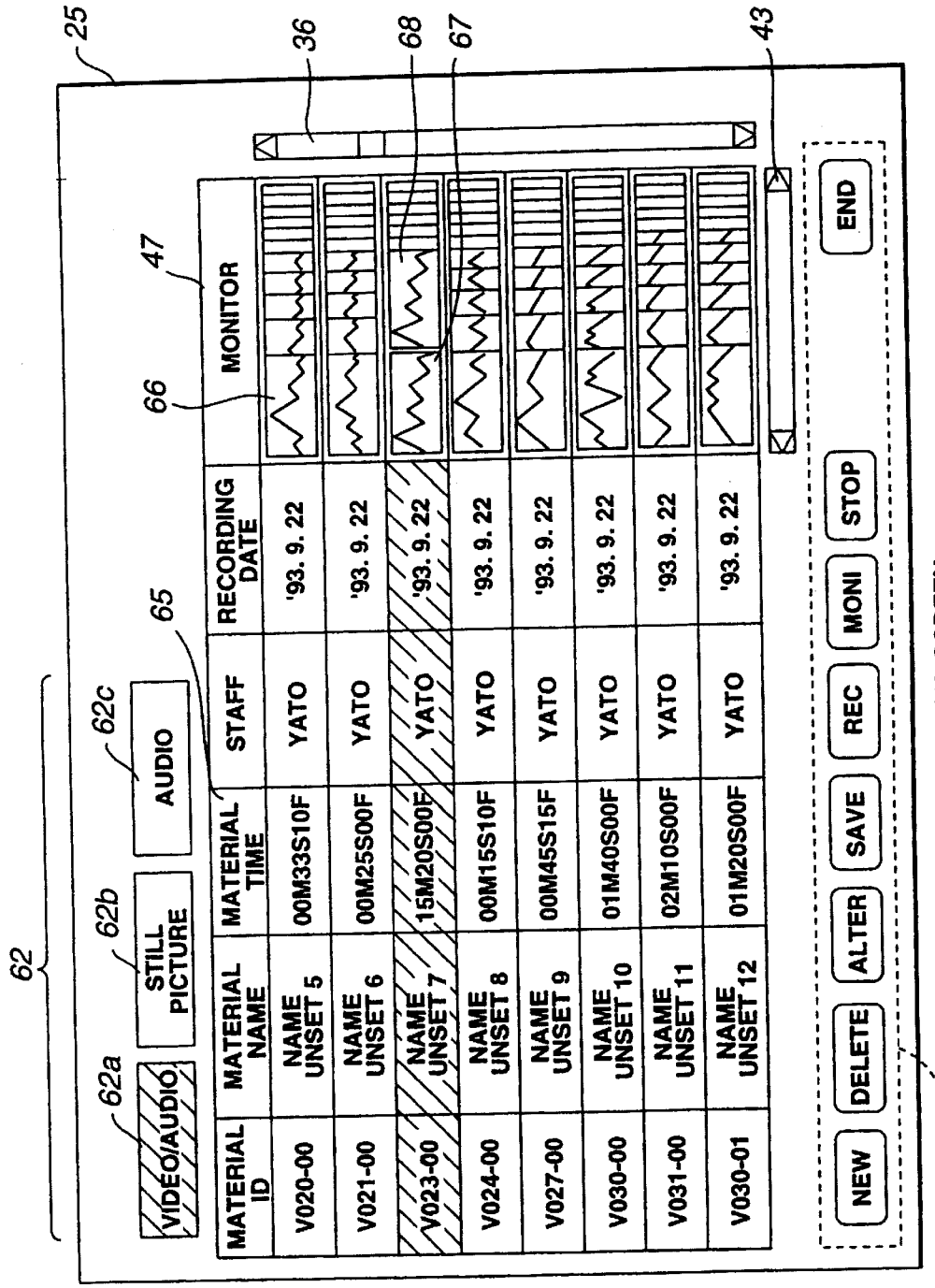
FIG. 22 is a view showing the material screen in which a material cut is being cut out.

Referring to FIGS. 22 and 23, cut-out of a material on the material screen will now be described.

The cut-out of the material is an operation of cutting out only a necessary material from video materials recorded in advance in the editing device 10 and deleting unnecessary frames.

The material cut-out operation will now be described with reference to FIG. 22.

On the material screen 25, a material as a cut-out target is selected by operating the input operating section 18. The entire row of the selected material is highlighted as shown in FIG. 22. In FIG. 22, a material (with a material ID "V023-00" and a material name "NAME UNSET 7") in the third row from the top of the. material name display screen 65 is selected. The selected material is highlighted, and the above-described jog/shuttle dial 7 becomes effective. A frame of a cut-out start position of the image displayed in the monitor column 47 is selected by using the jog/shuttle dial 7, specifically, by operating the dial 7c of the jog/shuttle dial 7, and then, the cut-out start position is determined by operating the in-button 7a. As for a cut-out end position, a frame of the cut-out end position is selected by operating the dial 7c of the jog/shuttle dial 7, and then the cut-out end position is determined by operating the out-button 7b.

On completion of the material cut-out operation, a material ID is automatically appended and is newly added to the list in the material name display screen 65. In the example of FIG. 22, the last two digits of the material ID are altered from "V023-00" to "V023-01" so as to be added to the material name display screen 65.

When the cut-out operation of each material and the subsequent addition to the list in the material name display screen 65 are completed, the material screen 25 as shown in FIG. 23 is obtained.

In the material screen 25 of FIG. 23, materials in the fourth to seventh rows displayed in the material name display screen 65 are materials cut out from the material displayed in the third row. It is know from the material IDs of the fourth to seventh rows, displayed as "V023-01", "V023-02", "V023-03" and "V023-04", and the material ID of the third row, displayed as "V023-00", in which the first four digits are the same while the last two digits are altered. As a matter of course, other forms of display may be used, such as material IDs in which certain parts of the digits are the same while the other parts are different, or columns of material IDs having different colors.

The above-described method is applied to the case where the video material is recorded and edited in accordance with the program registered in advance. However, the method may also be applied to the case where the program configuration is determined after recording the video material so that editing is carried out after that.

According to the editing device and the editing system of the present invention, the device and system may be provided which enable sufficient exertion of the functions thereof even when various limitations such as the skill of the operator are imposed in actual editing work using video materials or the like.

Industrial Applicability

The editing device of the present invention may be applied to various editing devices and editing systems such as an editing device used at a broadcasting station or a production house.

What is claimed is:

1. An editing device comprising:

a non-linearly accessible recording medium;

recording means for recording video and/or audio programs onto the recording medium;

display means for displaying a program configuration table indicating individual programs and images and/or sounds included in each program, said table including rows and columns, each row including information for a respective program, a first column of said row including an identification code for said program, a second column of said row including images of said program, said images including a first image comprising a leading frame of said program, and a second image composed of frames extracted from the frames of the program;

operating means for updating the program configuration table displayed by the display means; and control means responsive to the operating means for registering in the program configuration table the identification codes of respective programs indicated by the program configuration table; said operating means and said control means cooperating to cause the recording means to record only images and/or sounds of a program indicated by a selected one of the registered identification codes.

2. The editing device as claimed in claim 1, wherein the control means controls the display means to display only images selected by the operating means in a predetermined recording order on a frame-by-frame basis on the program configuration table.

3. The editing device as claimed in claim 1, further comprising:

reproduction output means for reproducing images and/or sounds recorded on the recording medium, and outputting the reproduced images and/or sounds in the order represented by the program configuration table displayed on the display means.

4. The editing device as claimed in claim 1, further comprising special effect processing means for applying special effects to images and/or sounds already recorded on the recording medium.

5. An editing method comprising the steps of:

recording video and/or audio programs onto a non-linearly accessible recording medium;

displaying a program configuration table indicating individual programs and images and/or sounds included in each program, said table including rows and columns, each row including information for a respective program, a first column of said row including an identification code for said program, a second column of said row including images of said program, said images including a first image comprising a leading frame of said program, and a second image composed of frames extracted from the frames of the program;

updating the displayed program configuration table;

registering in the program configuration table the identification codes of respective programs indicated by the program configuration table; and recording only images and/or sounds of a program indicated by a selected one of the registered identification codes.

6. The editing method of claim 5, wherein the indicated images are displayed in a recording order on a frame by frame basis on the program configuration table.

7. The editing method of claim 5, further comprising the steps of:

reproducing images and/or sounds recorded on the recording medium and outputting the reproduced images and/or sounds in the order of the program configuration table.

8. The editing method of claim 5, further comprising the step of applying special effects to images and/or sounds already recorded on the recording medium.

* * * * *